(12) United States Patent
Inoue et al.

(10) Patent No.: US 9,698,412 B2
(45) Date of Patent: *Jul. 4, 2017

(54) NEGATIVE ELECTRODE FOR POWER STORAGE DEVICE AND POWER STORAGE DEVICE

(71) Applicant: SEMICONDUCTOR ENERGY LABORATORY CO., LTD., Atsugi-shi, Kanagawa-ken (JP)

(72) Inventors: Nobuhiro Inoue, Kanagawa (JP); Kai Kimura, Kanagawa (JP); Sachiko Kataniwa, Tochigi (JP); Ryota Tajima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,725

(22) Filed: Oct. 5, 2016

(65) Prior Publication Data
US 2017/0025675 A1  Jan. 26, 2017

Related U.S. Application Data

(63) Continuation of application No. 14/859,703, filed on Sep. 21, 2015, now Pat. No. 9,490,080, which is a (Continued)

(30) Foreign Application Priority Data

Jun. 1, 2012 (JP) ................... 2012-126355
Mar. 11, 2013 (JP) ................... 2013-047833

(51) Int. Cl.
*H01M 10/05* (2010.01)
*H01M 4/131* (2010.01)
(Continued)

(52) U.S. Cl.
CPC ............ *H01M 4/131* (2013.01); *H01G 11/06* (2013.01); *H01G 11/28* (2013.01); *H01G 11/46* (2013.01);
(Continued)

(58) Field of Classification Search
CPC ...... H01M 4/485; H01M 4/131; H01M 4/134; H01M 4/36; H01M 4/38; H01G 11/50; H01G 11/58
See application file for complete search history.

(56) References Cited

U.S. PATENT DOCUMENTS 5,015,547 A   5/1991  Koshiba et al.
5,338,625 A   8/1994  Bates et al.
(Continued)

FOREIGN PATENT DOCUMENTS

CN   102077393 A   5/2011
EP   1575104 A    9/2005
(Continued)

OTHER PUBLICATIONS

Ogumi.Z et al., "6.1.6 Influence of Electrolytic Solution and Surface Film Formation", Lithium secondary battery, Mar. 20, 2008, pp. 116-124, OHMSHA.
(Continued)

*Primary Examiner* — Mark F Huff
*Assistant Examiner* — Monique Wills
(74) *Attorney, Agent, or Firm* — Nixon Peabody LLP; Jeffrey L. Costellia

(57) ABSTRACT

A decomposition reaction of an electrolyte solution and the like caused as a side reaction of charge and discharge is minimized in repeated charge and discharge of a lithium ion battery or a lithium ion capacitor, and thus the lithium ion battery or the lithium ion capacitor can have long-term cycle performance. A negative electrode for a power storage
(Continued)

device includes a negative electrode current collector and a negative electrode active material layer which includes a plurality of particles of a negative electrode active material. Each of the particles of the negative electrode active material has an inorganic compound film containing a first inorganic compound on part of its surface. The negative electrode active material layer has a film in contact with an exposed part of the negative electrode active material and part of the inorganic compound film. The film contains an organic compound and a second inorganic compound.

28 Claims, 20 Drawing Sheets

Related U.S. Application Data continuation of application No. 13/898,509, filed on May 21, 2013, now Pat. No. 9,183,995.

(51) Int. Cl.

| | |
|---|---|
| H01G 11/68 | (2013.01) |
| H01M 4/62 | (2006.01) |
| H01M 4/1393 | (2010.01) |
| H01M 4/133 | (2010.01) |
| H01M 4/36 | (2006.01) |
| H01G 11/06 | (2013.01) |
| H01G 11/28 | (2013.01) |
| H01G 11/50 | (2013.01) |
| H01G 11/46 | (2013.01) |
| H01G 11/58 | (2013.01) |
| H01M 4/134 | (2010.01) |
| H01M 4/38 | (2006.01) |
| H01M 4/485 | (2010.01) |
| H01G 11/66 | (2013.01) |
| H01M 4/48 | (2010.01) |
| H01M 10/0525 | (2010.01) |
| H01M 4/02 | (2006.01) |

(52) U.S. Cl.
CPC ............ *H01G 11/50* (2013.01); *H01G 11/58* (2013.01); *H01G 11/66* (2013.01); *H01G 11/68* (2013.01); *H01M 4/133* (2013.01); *H01M 4/134* (2013.01); *H01M 4/1393* (2013.01); *H01M 4/362* (2013.01); *H01M 4/366* (2013.01); *H01M 4/386* (2013.01); *H01M 4/483* (2013.01); *H01M 4/485* (2013.01); *H01M 4/62* (2013.01); *H01M 4/628* (2013.01); *H01M 10/0525* (2013.01); *H01M 2004/027* (2013.01); *Y02E 60/122* (2013.01); *Y02E 60/13* (2013.01)

(56) References Cited

U.S. PATENT DOCUMENTS

| | | | |
|---|---|---|---|
| 6,063,142 A | 5/2000 | Kawakami et al. |
| 6,218,050 B1 | 4/2001 | Yoon et al. |
| 6,333,128 B1 | 12/2001 | Sunagawa et al. |
| 6,641,955 B1 | 11/2003 | Matsubara et al. |
| 6,685,804 B1 | 2/2004 | Ikeda et al. |
| 6,828,063 B2 | 12/2004 | Park et al. |
| 6,887,511 B1 | 5/2005 | Shima et al. |
| 7,179,561 B2 | 2/2007 | Niu et al. |
| 7,192,673 B2 | 3/2007 | Ikeda et al. |
| 7,235,330 B1 | 6/2007 | Fujimoto et al. |
| 7,241,533 B1 | 7/2007 | Ikeda et al. |
| 7,285,359 B2 | 10/2007 | Yamamoto et al. |
| 7,410,728 B1 | 8/2008 | Fujimoto et al. |
| 7,491,467 B2 | 2/2009 | Satoh et al. |
| 7,745,047 B2 | 6/2010 | Zhamu et al. |
| 7,781,101 B2 | 8/2010 | Okazaki et al. |
| 7,794,881 B1 | 9/2010 | Fujimoto et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,080,337 B2 | 12/2011 | Higuchi et al. |
| 8,278,011 B2 | 10/2012 | Zhu et al. |
| 8,399,132 B2 | 3/2013 | Park |
| 8,628,885 B2 | 1/2014 | Yamaguchi et al. |
| 2001/0053480 A1 | 12/2001 | Koga et al. |
| 2002/0168574 A1 | 11/2002 | Ahn et al. |
| 2004/0101761 A1 | 5/2004 | Park et al. |
| 2004/0126659 A1 | 7/2004 | Graetz et al. |
| 2005/0008935 A1 | 1/2005 | Skotheim et al. |
| 2005/0191550 A1 | 9/2005 | Satoh et al. |
| 2006/0040182 A1 | 2/2006 | Kawakami et al. |
| 2007/0007239 A1 | 1/2007 | Lee et al. |
| 2007/0092797 A1 | 4/2007 | Konishiike et al. |
| 2008/0003503 A1 | 1/2008 | Kawakami et al. |
| 2008/0254296 A1 | 10/2008 | Handa et al. |
| 2009/0029264 A1 | 1/2009 | Nakazawa et al. |
| 2009/0117473 A1 | 5/2009 | Satoh et al. |
| 2009/0136847 A1 | 5/2009 | Jeong et al. |
| 2009/0169996 A1 | 7/2009 | Zhamu et al. |
| 2009/0214958 A1 | 8/2009 | Park |
| 2009/0311608 A1 | 12/2009 | Hirose et al. |
| 2010/0143798 A1 | 6/2010 | Zhamu et al. |
| 2010/0176337 A1 | 7/2010 | Zhamu et al. |
| 2010/0209784 A1 | 8/2010 | Yamazaki et al. |
| 2010/0248034 A1 | 9/2010 | Oki et al. |
| 2010/0330421 A1 | 12/2010 | Cui et al. |
| 2011/0012067 A1 | 1/2011 | Kay |
| 2011/0052997 A1 | 3/2011 | Kim et al. |
| 2011/0084229 A1 | 4/2011 | Kawakami et al. |
| 2011/0097627 A1 | 4/2011 | Watanabe et al. |
| 2011/0111303 A1 | 5/2011 | Kung et al. |
| 2011/0121240 A1 | 5/2011 | Amine et al. |
| 2011/0151290 A1 | 6/2011 | Cui et al. |
| 2011/0159372 A1 | 6/2011 | Zhamu et al. |
| 2011/0177396 A1 | 7/2011 | Moriwaka et al. |
| 2011/0229795 A1 | 9/2011 | Niu et al. |
| 2011/0250509 A1 | 10/2011 | Yamaguchi et al. |
| 2011/0266654 A1 | 11/2011 | Kuriki et al. |
| 2011/0291240 A1 | 12/2011 | Yamazaki |
| 2012/0045692 A1 | 2/2012 | Takemura et al. |
| 2012/0141866 A1 | 6/2012 | Kuriki et al. |
| 2012/0328956 A1 | 12/2012 | Oguni et al. |
| 2013/0052528 A1 | 2/2013 | Kuriki et al. |
| 2013/0164619 A1 | 6/2013 | Yamakaji et al. |
| 2013/0230772 A1 | 9/2013 | Noda et al. |
| 2013/0266858 A1 | 10/2013 | Inoue et al. |
| 2013/0295439 A1 | 11/2013 | Masarapu et al. |
| 2016/0012981 A1* | 1/2016 | Inoue ................. H01G 11/68 429/231.1 |

FOREIGN PATENT DOCUMENTS

| | | |
|---|---|---|
| JP | 04-080331 A | 3/1992 |
| JP | 11-060385 A | 3/1999 |
| JP | 11-096993 A | 4/1999 |
| JP | 2001-210315 A | 8/2001 |
| JP | 2004-014381 A | 1/2004 |
| JP | 2004-214182 A | 7/2004 |
| JP | 2004-281317 A | 10/2004 |
| JP | 2004-303593 A | 10/2004 |
| JP | 2005-272983 A | 10/2005 |
| JP | 2005-302510 A | 10/2005 |
| JP | 2005-332769 A | 12/2005 |
| JP | 2006-059641 A | 3/2006 |
| JP | 2006-265751 A | 10/2006 |
| JP | 2007-005201 A | 1/2007 |
| JP | 2009-164014 A | 7/2009 |
| JP | 2009-524567 | 7/2009 |
| JP | 2009-176721 A | 8/2009 |
| JP | 2009-238584 A | 10/2009 |
| JP | 2010-244847 A | 10/2010 |
| JP | 2010-250968 A | 11/2010 |

(56) References Cited

FOREIGN PATENT DOCUMENTS

| JP | 2011-503804 | 1/2011 |
|----|----|----|
| JP | 2011-517053 | 5/2011 |
| JP | 2011-159534 A | 8/2011 |
| WO | WO-2004/055925 | 7/2004 |
| WO | WO-2006/062947 | 6/2006 |
| WO | WO-2007/061945 | 5/2007 |
| WO | WO-2009/061685 | 5/2009 |
| WO | WO-2009/127901 | 10/2009 |
| WO | WO-2009/144600 | 12/2009 |
| WO | WO 2010/125467 | 11/2010 |

OTHER PUBLICATIONS

Inoue.N et al., "Improvement of cycle performance of lithium ion batteries at elevated temperature of 60 °C using graphite coated with metal oxide", 22nd ECS Meeting Abstract, Oct. 7, 2012, p. 654, ECS.

Zhou.X et al.,"Graphene modified LiFePO4 cathode materials for high power lithium ion batteries", J. Mater. Chem. (Journal of Materials Chemistry), 2011, vol. 21, pp. 3353-3358.

Su.F et al.,"Flexible and planar graphene conductive additives for lithium-ion batteries", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Kohno.H et al., "Silicon Nanoneedles Grown by a Simple Thermal Treatment Using Metal-Sulfur Catalysts", Jpn. Appl. Phys. (Japanses Journal of Applied Physics), Feb. 1, 2002, vol. 41, No. 2A, pp. 577-578.

Kamins.T et al., "Ti-catalyzed Si nanowires by chemical vapor deposition: Microscopy and growth mechanisms", J. Appl. Phys. (Journal of Applied Physics), Jan. 15, 2001, vol. 89, No. 2, pp. 1008-1016.

Cui.L et al., "Crystalline-Amorphous Core-Shell Silicon Nanowires for High-Capacity and High Current Battery Electrodes", Nano Letters, 209, vol. 9, No. 1, pp. 491-495.

Peled.E et al., "Advanced Model for Solid Electrolyte Interphase Electrodes in Liquid and Polymer Electrolytes", J. Electrochem. SOC. (Journal of the Electrochemical Society), Aug. 1, 1997, vol. 144, No. 8, pp. L208-L210.

Chinese Office Action (Application No. 201310212001.8) Dated Jul. 20, 2016.

* cited by examiner

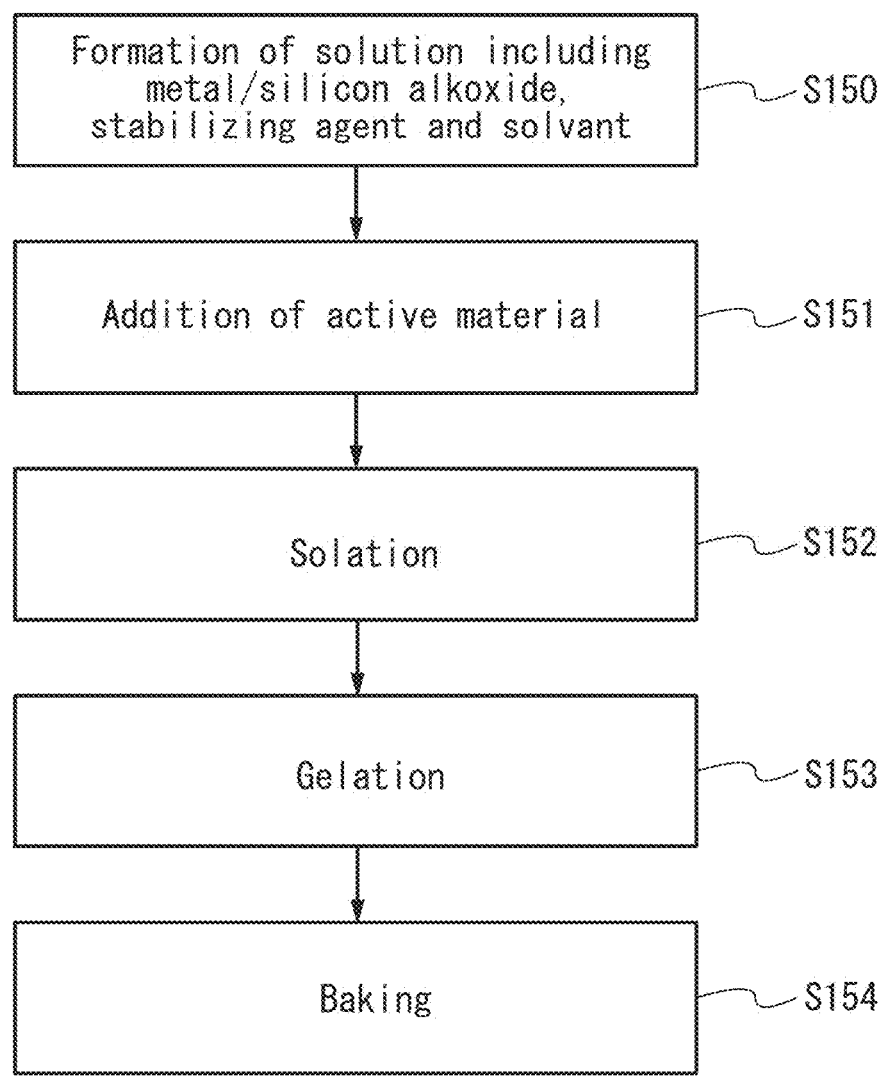

680

680    682    684

683

681

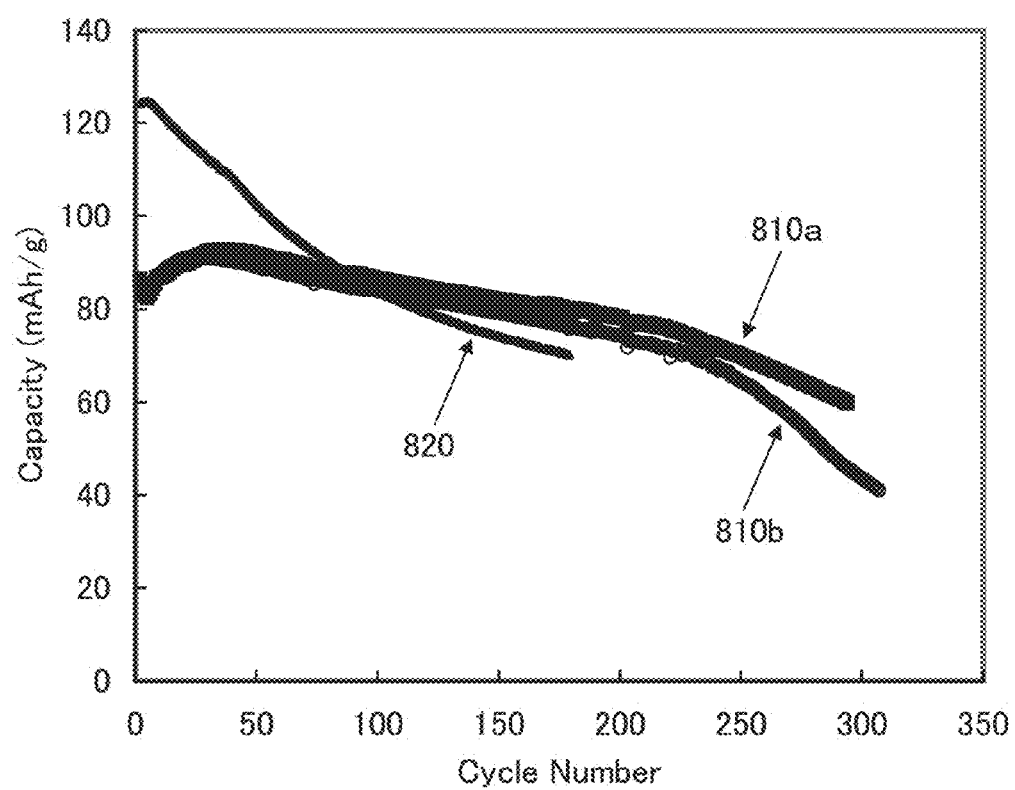

NEGATIVE ELECTRODE FOR POWER STORAGE DEVICE AND POWER STORAGE DEVICE

BACKGROUND OF THE INVENTION

1. Field of the Invention

The present invention relates to a negative electrode for a power storage device and a power storage device.

2. Description of the Related Art

A variety of power storage devices, for example, non-aqueous secondary batteries such as lithium ion batteries (LIBs), lithium ion capacitors (LICs), and air cells have been actively developed in recent years. In particular, demand for lithium ion batteries with high output and high energy density has rapidly grown with the development of the semiconductor industry, as in the cases of electronic appliances, for example, portable information terminals such as mobile phones, smartphones, and laptop computers, portable music players, and digital cameras; medical equipment; and next-generation clean energy vehicles such as hybrid electric vehicles (HEVs), electric vehicles (EVs), and plug-in hybrid electric vehicles (PHEVs). The lithium ion batteries are essential for today's information society as chargeable energy supply sources.

A negative electrode for the power storage devices such as the lithium ion batteries and the lithium ion capacitors is a structure body including at least a current collector (hereinafter referred to as a negative electrode current collector) and an active material layer (hereinafter referred to as a negative electrode active material layer) provided over a surface of the negative electrode current collector. The negative electrode active material layer contains an active material (hereinafter referred to as a negative electrode active material), such as carbon or silicon, which can store and release lithium ions serving as carrier ions.

At present, a negative electrode of a lithium ion battery using a graphite based carbon material is generally formed by mixing graphite (black lead) that is a negative electrode active material, acetylene black (AB) as a conductive additive, PVdF that is a resin as a binder to form slurry, applying the slurry over a current collector, and drying the slurry, for example.

Such a negative electrode of a lithium ion battery and a lithium ion capacitor has an extremely low electrode potential and a high reducing ability. For this reason, an electrolyte solution using an organic solvent is reduced and decomposed. The range of potentials in which the electrolysis of an electrolyte solution does not occur is referred to as a potential window. Although the negative electrode essentially needs to have an electrode potential in the potential window of the electrolyte solution, the negative electrode potential of a lithium ion battery or a lithium ion capacitor is out of the potential windows of almost all electrolyte solutions. In actually a decomposition product thereof forms a passivating film (also referred to as a solid electrolyte film (solid electrolyte interphase)) on the surface of the negative electrode, and the passivating film prevents further reductive decomposition. Thus, lithium ions can be inserted into the negative electrode with the use of a low electrode potential below the potential window of the electrolyte solution (for example, see Non-Patent Document 1).

REFERENCE

[Non-Patent Document 1] Zempachi Ogumi, "Lithium Secondary Battery", Ohmsha, Ltd., first impression of the first edition published on March 20, H20, pp. 116-118

SUMMARY OF THE INVENTION

The passivating film is a reductive decomposition product of a reductive decomposition reaction of the electrolyte solution or a product of a reaction between the reductive decomposition product and the electrolyte solution. For example, in the case where a negative electrode active material is graphite, since the graphite has a layered structure, a passivating film is formed between layers in an edge surface of the graphite and a surface (basal surface) of the graphite. When carrier ions are inserted into the graphite and thus the volume of the graphite increases, part of the passivating film is separated from the graphite and part of the graphite is exposed.

Although generation of the passivating film kinetically suppresses decomposition of the electrolyte solution, the thickness of the passivating film gradually increases due to repeated charge and discharge. The passivating film having an increased thickness is susceptible to the volume expansion of the negative electrode active material, and part of the passivating film is easily separated.

Another passivating film is formed on a surface of the negative electrode active material which is exposed by the separation of the passivating film.

A passivating film of a conventional negative electrode has been considered to be formed due to a battery reaction at the time of charge, and electrical charges consumed in the formation of the passivating film are the cause for irreversible capacity. This results in a decrease in capacity of a lithium ion battery. In addition, separation of the passivating film due to repeated charge and discharge and formation of another passivating film further reduce the capacity of the lithium ion battery.

Further, the higher the temperature is, the faster the electrochemical reaction is. Accordingly, the capacity of the lithium ion battery decreases more significantly, as charge and discharge are repeated at high temperature.

The above problems exist not only in lithium ion batteries but also in lithium ion capacitors.

In view of the above, an object of one embodiment of the present invention is to stabilize a surface of a negative electrode active material in a negative electrode for a lithium ion battery or a lithium ion capacitor. Further, another object of one embodiment of the present invention is to minimize electrochemical decomposition of an electrolyte solution and the like in the negative electrode.

Further, an object of one embodiment of the present invention is to minimize a decomposition reaction of an electrolyte solution and the like caused as a side reaction of charge and discharge in repeated charge and discharge of a lithium ion battery or a lithium ion capacitor so that the lithium ion battery or the lithium ion capacitor has long-term cycle performance.

It is probable that decomposition of an electrolyte solution occurs electrochemically. Graphite or silicon is generally used as a negative electrode active material, and electric conductivity thereof is relatively high. Even silicon that is a semiconductor has high electric conductivity in the state where lithium is inserted into the silicon. For this reason, a decomposition reaction of an electrolyte solution takes place on a surface of a negative electrode active material.

On the other hand, a particulate negative electrode active material with an average diameter of several hundred nanometers to several tens of micrometers is used in a negative electrode of a lithium ion battery or a lithium ion capacitor to maintain a constant speed of charge and discharge. Thus, the negative electrode can be regarded as a porous electrode that is an aggregate of particles of the negative electrode active material and the surface area thereof is large. Consequently, an area where a battery reaction can occur is large, which increases the occurrence of the decomposition reaction of an electrolyte solution.

Hence, a negative electrode active material having an inorganic compound film on part of its surface and a film typified by a passivating film (hereinafter referred to as a film), which is in contact with an exposed portion of the negative electrode active material and the inorganic compound film, are used to form a negative electrode active material layer. As a result, in the inorganic compound film provided on the part of the surface of the negative electrode active material, electron conductivity can be suppressed while the conductivity of carrier ions is ensured, which makes it possible to minimize the decomposition reaction of the electrolyte solution on the surface of the negative electrode active material.

Furthermore, one embodiment of the present invention is a negative electrode for a power storage device including a negative electrode current collector and a negative electrode active material layer which is over the negative electrode current collector and includes a plurality of particles of a negative electrode active material. Each of the particles of the negative electrode active material has an inorganic compound film containing a first inorganic compound as a component on part of its surface. The negative electrode active material layer has a film in contact with an exposed portion of part of the negative electrode active material and part of the inorganic compound film. The film contains an organic compound and a second inorganic compound as components.

A particulate material is used for the negative electrode active material. For example, a particulate negative electrode active material with an average diameter of more than or equal to 6 μm and less than or equal to 30 μm can be used. For a material of the negative electrode active material, graphite that is a carbon material generally used in the field of power storage can be used. Examples of graphite include low crystalline carbon such as soft carbon and hard carbon and high crystalline carbon such as natural graphite, kish graphite, pyrolytic graphite, mesophase pitch based carbon fiber, meso-carbon microbeads (MCMB), mesophase pitches, petroleum-based coke, and coal-based coke. Further, a material which is alloyed and dealloyed with carrier ions giving and receiving electrical charges may be used. Examples of such a material include magnesium, calcium, aluminum, silicon, germanium, tin, lead, arsenic, antimony, bismuth, silver, gold, zinc, cadmium, mercury, and the like.

Other than lithium ions used for lithium ion batteries or lithium ion capacitors, examples of carrier ions include alkali-metal ions such as sodium ions and potassium ions; alkaline-earth metal ions such as calcium ions, strontium ions, and barium ions; beryllium ions; magnesium ions; and the like.

The inorganic compound film provided on part of a surface of the particulate negative electrode active material contains the first inorganic compound as a component. As the first inorganic compound, an oxide of any one of niobium, titanium, vanadium, tantalum, tungsten, zirconium, molybdenum, hafnium, chromium, aluminum, and silicon or an oxide containing any one of these elements and lithium can be used. The inorganic compound film is much denser than a passivating film conventionally formed on a surface of a negative electrode due to a reductive decomposition reaction of an electrolyte solution. In addition, since the inorganic compound film is stable in charge and discharge, the thickness thereof slightly changes due to charge and discharge or does not change.

Having carrier ion conductivity, the inorganic compound film can transmit carrier ions, and therefore the battery reaction of the negative electrode active material can occur. On the other hand, having low electron conductivity and an insulating property, the inorganic compound film can suppress a reaction between the electrolyte solution and the negative electrode active material. For these reasons, a material which has a high carrier ion diffusion coefficient and whose electron conductivity is as low as possible is preferably used for the inorganic compound film. Further, since the inorganic compound film itself does not function as the active material for the battery reaction, the inorganic compound film is preferably thin enough to transmit carrier ions. The thickness of the inorganic compound film is preferably more than or equal to 5 nm and less than or equal to 50 nm.

For example, niobium oxide ($Nb_2O_5$) which can be used for the inorganic compound film provided on part of the surface of the particulate negative electrode active material has a low electron conductivity of $10^{-9}$ S/cm$^2$ and a high insulating property. Thus, a niobium oxide film inhibits an electrochemical decomposition reaction between the negative electrode active material and the electrolyte solution. On the other hand, niobium oxide has a lithium diffusion coefficient of $10^{-9}$ cm$^2$/sec and high lithium ion conductivity, and therefore can transmit lithium ions. However, an inorganic compound film with an increased thickness increases an insulating property, and lithium ions are prevented from freely moving inside and outside the negative electrode active material; thus, a battery reaction cannot occur. Therefore, the thickness of the niobium oxide film is preferably more than or equal to 5 nm and less than or equal to 50 nm.

When carrier ions solvated with a solvent of the electrolyte solution pass through the inorganic compound film provided on part of the surface of the negative electrode active material, they are desolvated, and only the carrier ions are diffused into the negative electrode active material. Therefore, the inorganic compound film provided on part of the surface of the negative electrode active material reduces an area of a portion where the electrolyte solution is directly in contact with the negative electrode active material, which makes it possible to suppress a reductive decomposition reaction of the electrolyte solution. Consequently, an increase in the thickness of the film provided over the exposed portion of the negative electrode active material and the inorganic compound film can be suppressed, and separation of the film due to repeated charge and discharge can be suppressed.

Note that it is preferable that the negative electrode active material be not covered with the inorganic compound film completely and at least part of the negative electrode active material be exposed to ensure a path for electronic conduction between the negative electrode active material and the outside.

Further, the film provided over the exposed portion of the negative electrode active material and the inorganic compound film contains the organic compound and the second inorganic compound as the components. The organic compound is a reductive decomposition product of the reductive decomposition reaction of the electrolyte solution or a product of a reaction between the reductive decomposition product and the electrolyte solution. The second inorganic compound is a product of a reaction between the carrier ions and an organic compound contained in the electrolyte solution and is, typically, one of a fluoride, a carbonate, an oxide, and a hydroxide which include a metal element of the carrier ions. Therefore, the second inorganic compound is different from the first inorganic compound.

The film has high carrier ion conductivity and low electron conductivity. For this reason, when the inorganic compound film is not provided on the negative electrode active material and a surface of the film is the surface of the negative electrode active material layer, the reductive decomposition reaction of the electrolyte solution can be suppressed. However, the suppression is temporary, and the thickness of the film increases due to repeated charge and discharge and thus part of the film is separated.

In one embodiment of the present invention, the film is provided on a surface of the inorganic compound film provided on part of the surface of the negative electrode active material and on the exposed portion of the negative electrode active material; thus, adhesion between the inorganic compound film and the film can be increased. As a result, separation of the film provided on the exposed portion of the negative electrode active material and the surface of the inorganic compound film due to repeated charge and discharge can be suppressed.

Further, the inorganic compound film is thinned so that carrier ions can pass through the inorganic compound film and the film is provided in contact with the exposed portion of the negative electrode active material and the inorganic compound film, which makes it possible to suppress the electron conductivity of the inorganic compound film and the film while the carrier ion conductivity of the inorganic compound film and the film is secured. In other words, it is possible to minimize the reductive decomposition reaction of the electrolyte solution on the surface of the negative electrode active material; consequently, a decrease in the capacity of the power storage device can be suppressed.

As described above, the inorganic compound film is formed on part of the surface of the particulate negative electrode active material and the film is provided on the exposed portion of the negative electrode active material and the inorganic compound film; thus, the surface of the negative electrode active material can be stable, and the decomposition reaction of the electrolyte solution can be minimized while the battery reaction of the negative electrode active material is possible.

According to one embodiment of the present invention, a negative electrode active material of a lithium ion battery or a lithium ion capacitor has a stable surface, which makes is possible to minimize electrochemical decomposition of an electrolyte solution and the like in a negative electrode.

Further, according to one embodiment of the present invention, a decomposition reaction of an electrolyte solution and the like caused as a side reaction of charge and discharge can be minimized in repeated charge and discharge of a lithium ion battery or a lithium ion capacitor, and thus the lithium ion battery or the lithium ion capacitor can have long-term cycle performance.

BRIEF DESCRIPTION OF THE DRAWINGS

FIG. 2 illustrates a method for forming a negative electrode active material having an inorganic compound film.
FIG. 20 shows cycle performance.

DETAILED DESCRIPTION OF THE INVENTION

Embodiments and an example are described below with reference to drawings. However, the embodiments and the example can be implemented with various modes. It will be readily appreciated by those skilled in the art that modes and details can be changed in various ways without departing from the spirit and scope of the present invention. Thus, the present invention should not be interpreted as being limited to the following description of the embodiments and the example.

(Embodiment 1)

In this embodiment, a structure of a negative electrode active material having an inorganic compound film which can suppress a decomposition reaction of an electrolyte solution is described with reference to FIGS. 1A to 1D.

Figure 1A:
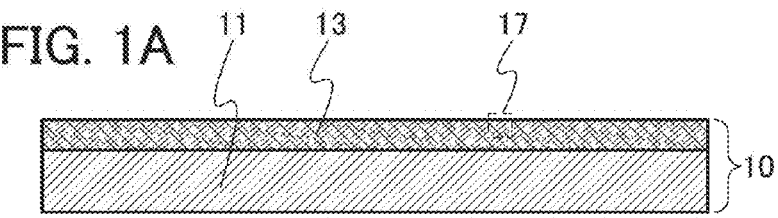
FIGS. 1A to 1D illustrate a negative electrode and a negative electrode active material having an inorganic compound film.
Figure 1B:
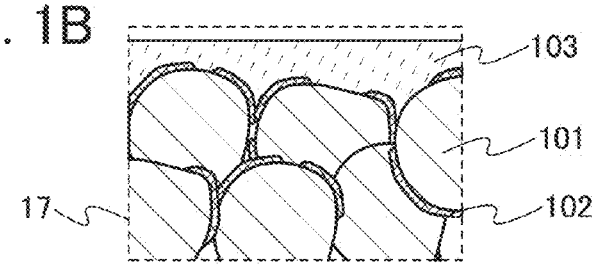
Figure 1C:
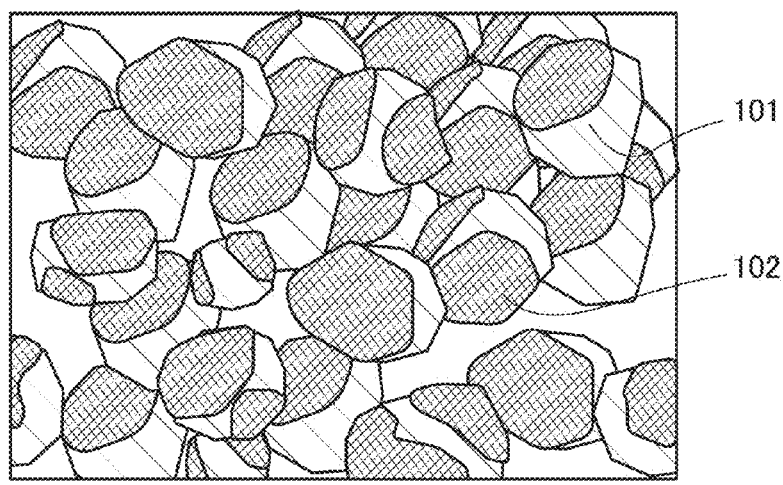
Figure 1D:
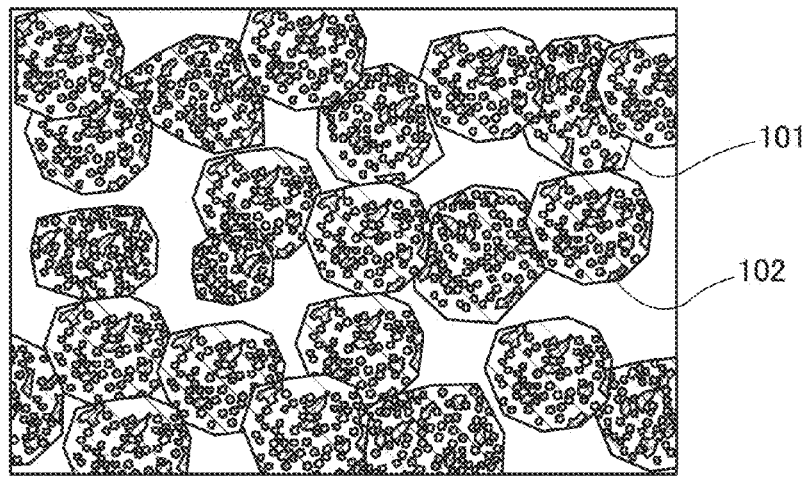

FIGS. 1A and 1B illustrate a negative electrode for a power storage device of the present invention. FIGS. 1C and 1D each illustrate a negative electrode active material used in the negative electrode for a power storage device.

FIG. 1A is a cross-sectional view of a negative electrode 10 including a negative electrode current collector 11 and a negative electrode active material layer 13 provided on one or both surfaces (on one surface in FIG. 1A) of the negative electrode current collector 11.

FIG. 1B is an enlarged cross-sectional view of part of the negative electrode active material layer 13 surrounded by the dashed line 17 in FIG. 1A. The negative electrode active material layer 13 includes a negative electrode active material 101 having an inorganic compound film 102 on part of its surface. In addition, the negative electrode active material layer 13 includes a film 103 which is in contact with an exposed portion of part of the negative electrode active material 101 and part of the inorganic compound film 102.

The negative electrode active material 101 is a particle, a fine particle, or powder (hereinafter the negative electrode active material is also referred to as a particulate negative electrode active material). Particles of the negative electrode active material 101 are not necessarily in a spherical shape and the particles may have given shapes different from each other. As the particulate negative electrode active material 101, a commercial negative electrode active material can be used. For example, a particulate negative electrode active material with an average diameter of more than or equal to 6 μm and less than or equal to 30 μm can be used. A method for forming the negative electrode active material 101 is not limited as long as the negative electrode active material 101 has the above-described shape.

For the material of the negative electrode active material 101, graphite that is a carbon material generally used in the field of power storage can be used. Examples of graphite include low crystalline carbon such as soft carbon and hard carbon and high crystalline carbon such as natural graphite, kish graphite, pyrolytic graphite, mesophase pitch based carbon fiber, meso-carbon microbeads (MCMB), mesophase pitches, petroleum-based coke, and coal-based coke. Graphite has a low potential substantially equal to that of a lithium metal (0.1 V to 0.3 V vs. Li/Li$^+$) when lithium ions are intercalated into the graphite (when a lithium-graphite intercalation compound is generated). For this reason, a lithium ion battery can have a high operating voltage. In addition, graphite is preferable because of its advantages such as relatively high capacity per volume, small volume expansion, low cost, and safety greater than that of a lithium metal.

Alternatively, a material which is alloyed and dealloyed with carrier ions giving and receiving electrical charges may be used. Examples of such a material include magnesium, calcium, aluminum, silicon, germanium, tin, lead, arsenic, antimony, bismuth, silver, gold, zinc, cadmium, mercury, and the like. Such elements have higher capacity than carbon. In particular, silicon has a theoretical capacity of 4200 mAh/g, which is significantly high. For this reason, silicon is preferably used as the negative electrode active material. Examples of an alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Further alternatively, as the negative electrode active material, lithium titanium oxide ($Li_4Ti_5O_{12}$), a lithium-graphite intercalation compound ($Li_xC_6$), or the like can be used.

Still further alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N$ is preferable because of high capacity (900 mAh/g).

The nitride containing lithium and a transition metal is preferably used, in which case lithium ions are contained in the negative electrode active material, and thus the negative electrode active material can be used in combination with a material for a positive electrode active material which does not contain lithium ions, such as $V_2O_5$ or $Cr_3O_8$. Note that even in the case of using a material containing lithium ions as the positive electrode active material, the nitride containing lithium and a transition metal can be used as the negative electrode active material by extracting lithium ions contained in the positive electrode active material in advance.

Still further alternatively, as the negative electrode active material, a material which causes a conversion reaction can be used. For example, a transition metal oxide which does not cause an alloying reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, and $RuO_2$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The inorganic compound film 102 is provided on a surface of a particle of such a negative electrode active material 101. As illustrated in FIG. 1C, the inorganic compound film 102 does not cover the surface of the particle of the negative electrode active material 101 entirely, and cover the surface partly. Thus, there are a region covered with the inorganic compound film 102 and a region not covered with the inorganic compound film 102 in the surface of the particle of the negative electrode active material 101. In addition, the inorganic compound film 102 covering the particle of the negative electrode active material 101 may have a relatively large surface covering a few percent to several tens of percent of the surface area of the particle of the negative electrode active material 101 as illustrated in FIG. 1C or a surface with a very small area as illustrated in FIG. 1D. The size of the inorganic compound film 102 attached on the surface of the particle of the negative electrode active material 101 can be appropriately adjusted depending on conditions of a sol-gel method described later, the shape or state of a surface of a negative electrode active material to be used, or the like.

As the material of the inorganic compound film 102, an oxide film of any one of niobium, titanium, vanadium, tantalum, tungsten, zirconium, molybdenum, hafnium, chromium, aluminum, and silicon or an oxide film containing any one of these elements and lithium can be used. The inorganic compound film 102 formed using such a material is much denser than a passivating film conventionally formed on a surface of a negative electrode active material due to a decomposition product of an electrolyte solution.

For example, niobium oxide ($Nb_2O_5$) has a low electron conductivity of $10^{-9}$ S/cm$^2$ and a high insulating property. For this reason, a niobium oxide film inhibits an electrochemical decomposition reaction between the negative electrode active material and an electrolyte solution. On the other hand, niobium oxide has a lithium diffusion coefficient of $10^{-9}$ cm$^2$/sec and high lithium ion conductivity. Therefore, niobium oxide can transmit lithium ions.

Thus, having carrier ion conductivity, the inorganic compound film 102 provided on part of the surface of the negative electrode active material 101 can transmit carrier ions, and a battery reaction of the negative electrode active material 101 can occur. On the other hand, having an insulating property, the inorganic compound film 102 can suppress a reaction between an electrolyte solution and the negative electrode active material 101. Therefore, it is preferable that a material having a high carrier ion diffusion coefficient be used for the inorganic compound film 102 and the inorganic compound film 102 be formed as thin as possible (i.e., be a film having low electron conductivity). The inorganic compound film 102 is preferably thin enough to transmit carrier ions. Typically, the inorganic compound film 102 preferably has a thickness more than or equal to 5 nm and less than or equal to 50 nm.

When the negative electrode active material 101 is entirely isolated electrically, electrons are prevented from freely moving inside and outside the negative electrode active material 101; thus, the battery reaction cannot occur. Therefore, it is preferable that the negative electrode active material 101 be prevented from being completely covered with the inorganic compound film 102 and at least part of the negative electrode active material 101 be exposed without being covered with the inorganic compound film 102 to ensure a path for electron conduction with the outside.

The film 103 formed on the exposed portion of the negative electrode active material 101 and the surface of the inorganic compound film 102 is a reductive decomposition product of a reductive decomposition reaction of an electrolyte solution or a product of a reaction between the reductive decomposition product and the electrolyte solution. Therefore, the film 103 contains an inorganic compound and an organic compound that is the reductive decomposition product of the reductive decomposition reaction of the electrolyte solution or the product of the reaction between the reductive decomposition product and the electrolyte solution.

The inorganic compound contained in the film 103 is a fluoride, a carbonate, an oxide, or a hydroxide containing one of lithium, sodium, potassium, calcium, strontium, barium, beryllium, and magnesium.

When the carrier ions are lithium ions, lithium fluoride, lithium carbonate, lithium oxide, lithium hydroxide, or the like is given as the inorganic compound contained in the film 103. When the carrier ions are sodium ions, sodium fluoride, sodium carbonate, sodium oxide, sodium hydroxide, or the like is given as the inorganic compound.

The film 103 provided on the exposed portion of the negative electrode active material 101 has high carrier ion conductivity and low electron conductivity. For this reason, when the inorganic compound film 102 is not provided on the negative electrode active material 101 and the film 103 is formed on the surface of the negative electrode active material 101, the reductive decomposition reaction of the electrolyte solution can be suppressed; however, the suppression is temporary, and the volume of the negative electrode active material 101 changes and the thickness of the film 103 increases due to repeated charge and discharge and thus part of the film 103 is separated.

Therefore, the film 103 is provided on the exposed portion of the negative electrode active material 101 and the inorganic compound film 102 to enable an increase in adhesion between the inorganic compound film 102 and the film 103 in the negative electrode active material layer 13. As a result, separation of the film 103 can be suppressed even when charge and discharge are repeated.

The inorganic compound film 102, e.g., niobium oxide ($Nb_2O_5$), provided on part of the surface of the particulate negative electrode active material 101 has a low electron conductivity of $10^{-9}$ S/cm$^2$ and a high insulating property. Thus, a niobium oxide film inhibits the electrochemical decomposition reaction between the negative electrode active material and the electrolyte solution. On the other hand, niobium oxide has a lithium diffusion coefficient of $10^{-9}$ cm$^2$/sec and high lithium ion conductivity, and therefore can transmit lithium ions. However, the inorganic compound film 102 with an increased thickness increases an insulating property, and lithium ions are prevented from freely moving inside and outside the negative electrode active material 101, which inhibits the battery reaction.

Thus, the inorganic compound film 102 is thinned so that carrier ions can pass through the inorganic compound film 102 and the film 103 is provided in contact with the exposed portion of the negative electrode active material 101 and the inorganic compound film 102, which makes it possible to suppress the electron conductivity of the inorganic compound film 102 while the carrier ion conductivity of the inorganic compound film 102 is secured. In other words, it is possible to minimize the reductive decomposition reaction of the electrolyte solution on the surface of the negative electrode active material; consequently, a decrease in the capacity of the power storage device can be suppressed.

When carrier ions solvated with a solvent of the electrolyte solution pass through the inorganic compound film 102, they are desolvated, and only the carrier ions are diffused into the negative electrode active material 101. Therefore, an area of a portion where the electrolyte solution is directly in contact with the negative electrode active 101 is reduced, which makes it possible to suppress the reductive decomposition reaction of the electrolyte solution and to suppress an increase in the thickness of the film 103. Consequently, it is possible to suppress separation of the film 103 due to repeated charge and discharge.

As described above, the inorganic compound film 102 is formed on part of the surface of the particulate negative electrode active material 101 and the film 103 is provided on the exposed portion of the negative electrode active material 101 and the inorganic compound film 102; thus, the surface of the negative electrode active material 101 can be stable, and the decomposition reaction of the electrolyte solution can be minimized while the battery reaction of the negative electrode active 101 is possible.

This embodiment can be implemented combining with any of other embodiments as appropriate.

(Embodiment 2)

In this embodiment, a method for forming a particulate negative electrode active material having an inorganic compound film on part of its surface is described with reference to FIG. 2.

First, as Step S150, a solvent to which metal alkoxide and a stabilizing agent are added is stirred to form a solution. Toluene can be used as the solvent, for example. Ethyl acetoacetate can be used as the stabilizing agent, for example. Alternatively, as Step S150, a solvent to which silicon alkoxide and a stabilizing agent are added is stirred to form a solution.

For the metal alkoxide, a desired metal used to form the inorganic compound film provided on part of the surface of the negative electrode active material is selected.

Next, as Step S151, the solution to which a particulate negative electrode active material such as graphite is added is stirred. The solution is made into thick paste by stirring the solution to which a solvent such as toluene is added, and the metal alkoxide or the silicon alkoxide is provided on part of the surface of the negative electrode active material. Step S150 and Step S151 are preferably performed in an environment at low humidity, such as a dry room. This is because a hydrolysis reaction can be suppressed.

Next, in Step S152 and Step S153, the metal alkoxide or the silicon alkoxide on the surface of the particulate negative electrode active material is changed into a gel by a sol-gel method.

As Step S152, a small amount of water is added to the solution to which the negative electrode active material such as graphite is added, so that the metal alkoxide or the silicon alkoxide reacts with the water (i.e., hydrolysis reaction) to form a decomposition product which is a sol. Here, the term "being a sol" refers to being in a state where solid fine particles are substantially uniformly dispersed in a liquid. The small amount of water may be added by exposing the solution to which the negative electrode active material is added to the air. For example, in the case where Nb(OEt)$_5$ which is one of niobium alkoxide is used as the metal alkoxide, a hydrolysis reaction represented by Formula 1 occurs.

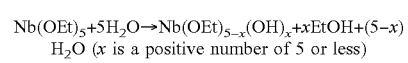

Nb(OEt)$_5$+5H$_2$O→Nb(OEt)$_{5-x}$(OH)$_x$+xEtOH+(5−x)H$_2$O (x is a positive number of 5 or less)     [Formula 1]

Alternatively, for example, in the case where Si(OEt)$_4$ which is one of silicon alkoxide is used, a hydrolysis reaction represented by Formula 2 occurs.

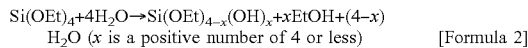

Si(OEt)$_4$+4H$_2$O→Si(OEt)$_{4-x}$(OH)$_x$+xEtOH+(4−x) H$_2$O (x is a positive number of 4 or less) [Formula 2]

Next, as Step S153, the decomposition product changed into the sol is dehydrated and condensed to be a reactant which is a gel. Here, "being a gel" refers to being in a state where a decomposition product which is a sol and has fluidity is solidified, and a three-dimensional network structure is developed due to attractive interaction between solid fine particles. In the case where Nb(OEt)$_5$ which is one of niobium alkoxide is used as the metal alkoxide, a condensation reaction represented by Formula 3 occurs.

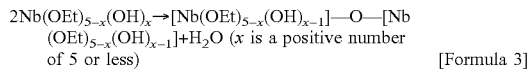

2Nb(OEt)$_{5-x}$(OH)$_x$→[Nb(OEt)$_{5-x}$(OH)$_{x-1}$]—O—[Nb (OEt)$_{5-x}$(OH)$_{x-1}$]+H$_2$O (x is a positive number of 5 or less) [Formula 3]

Alternatively, for example, in the case where Si(OEt)$_4$ which is one of silicon alkoxide is used, a condensation reaction represented by Formula 4 occurs.

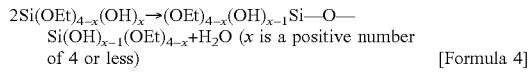

2Si(OEt)$_{4-x}$(OH)$_x$→(OEt)$_{4-x}$(OH)$_{x-1}$Si—O— Si(OH)$_{x-1}$(OEt)$_{4-x}$+H$_2$O (x is a positive number of 4 or less) [Formula 4]

Through this step, the reactant which is a gel attached on the surface of the particulate negative electrode active material can be formed. Note that although the solation by the hydrolysis reaction and the gelation by the condensation reaction are separately described above as two steps, Steps S152 and S153, for convenience, both reactions occur almost at the same time in practice. This is because the structure of metal alkoxide or silicon alkoxide gradually changes into that of a stable substance which is a gel, depending on conditions of temperature and water.

Then, as Step S154, the dispersion liquid is baked under an atmospheric pressure, whereby the particulate negative electrode active material with a metal oxide film or a silicon oxide film attached on the surface thereof can be obtained. The temperature of the baking is more than or equal to 300° C. and less than or equal to 900° C., preferably more than or equal to 500° C. and less than or equal to 800° C.

Through the above steps, a negative electrode active material having an inorganic compound film, which contains a metal oxide film or a silicon oxide film as a component, on part of its surface is formed. In the case of forming an inorganic compound film on a negative electrode active material by a sol-gel method in such a manner, the above steps can be even employed for a negative electrode active material having a complicated shape, and a large number of inorganic compound films can be formed; therefore, the method for forming a negative electrode active material described in this embodiment is an optimal method for a mass production process.

(Embodiment 3)

In this embodiment, a power storage device including the negative electrode described in Embodiment 1 and a method for forming the power storage device including the negative electrode are described with reference to FIGS. 3A to 3D, FIGS. 4A to 4C, FIGS. 5A and 5B, FIG. 6, and FIGS. 7A and 7B.

First, a negative electrode for a power storage device using a particulate negative electrode active material having an inorganic compound film on part of its surface and a method for forming the negative electrode are described with reference to FIGS. 3A to 3D.

Figure 3A:
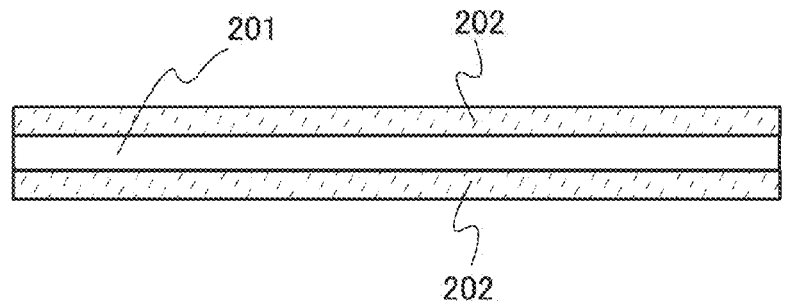
FIGS. 3A to 3D illustrate a negative electrode.

As illustrated in FIG. 3A, a negative electrode 200 includes a negative electrode current collector 201 and a negative electrode active material layer 202 provided on one or both surfaces (on the both surfaces in the drawing) of the negative electrode current collector 201.

The negative electrode current collector 201 is formed using a highly conductive material which is not alloyed with a carrier ion such as lithium. For example, stainless steel, iron, aluminum, copper, nickel, or titanium can be used. Alternatively, an alloy material such as an alloy of aluminum and nickel or an alloy of aluminum and copper may be used. In addition, the negative electrode current collector 201 can have a foil-like shape, a plate-like shape (sheet-like shape), a net-like shape, a punching-metal shape, an expanded-metal shape, or the like as appropriate. The negative electrode current collector 201 preferably has a thickness of more than or equal to 10 μm and less than or equal to 30 μm.

The negative electrode active material layer 202 is provided on one or both surfaces of the negative electrode current collector 201. The negative electrode active material layer 202 includes the particulate negative electrode active material having the inorganic compound film on part of its surface and the film in contact with the exposed portion of the negative electrode active material and the inorganic compound film, which are described in Embodiment 1 or 2.

Figure 3B:
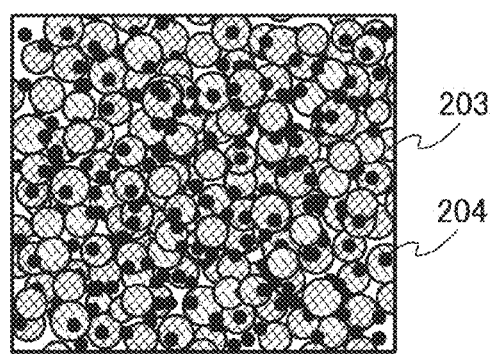

The negative electrode active material layer 202 is described with reference to FIG. 3B. FIG. 3B is a cross-sectional view of part of the negative electrode active material layer 202. The negative electrode active material layer 202 includes a particulate negative electrode active material 203 described in Embodiment 1 or 2, a conductive additive 204, and a binder (not illustrated). The particulate negative electrode active material 203 has an inorganic compound film on part of its surface as described in the above embodiments. In addition, in part of the negative electrode active material layer 202, a film (not illustrated) is provided on an exposed portion of the negative electrode active material 203 and the inorganic compound film.

The conductive additive 204 increases the conductivity between particles of the negative electrode active material 203 or between the negative electrode active material 203 and the negative electrode current collector 201, and is preferably added to the negative electrode active material layer 202. A material with a large specific surface is desirably used as the conductive additive 204, and acetylene black (AB) or the like is preferably used. Alternatively, a carbon material such as a carbon nanotube, graphene, or fullerene can be used. Note that the case of using graphene is described later as an example.

As the binder, a material which at least binds the negative electrode active material, the conductive additive, and the current collector is used. Examples of the binder include resin materials such as polyvinylidene fluoride (PVdF), a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, and polyimide.

The negative electrode 200 is formed in the following manner. First, the particulate negative electrode active material having the inorganic compound film formed by the method described in Embodiment 2 is mixed with a solvent such as NMP (N-methylpyrrolidone), in which a vinylidene fluoride based polymer such as polyvinylidene fluoride is dissolved, to form slurry.

Next, the slurry is applied on one or both of the surfaces of the negative electrode current collector 201, and dried. In the case where both surfaces of the negative electrode current collector 201 are subjected to the application step, the slurry is applied to the both surfaces at the same time or one by one, and dried. Then, rolling with a roller press machine is performed, and thus a structure body for a negative electrode in which the particulate negative electrode active material having the inorganic compound film on part of its surface is provided on one or both of the surfaces of the negative electrode current collector 201 is formed.

Next, the structure body for a negative electrode and a reference electrode of lithium or the like are immersed in an electrolyte solution described later, and voltage is applied to the negative electrode current collector 201 and the reference electrode. As a result, in the structure body for a negative electrode, a film is formed on an exposed portion of the negative electrode active material and the inorganic compound film, which are in contact with the electrolyte solution. In other words, the negative electrode 200 in which the negative electrode active material layer, which includes the particulate negative electrode active material having the inorganic compound film on part of its surface and the film in contact with the exposed portion of the negative electrode active material and the inorganic compound film, is provided over the negative electrode current collector 201 can be formed.

Next, an example of using graphene as the conductive additive added to the negative electrode active material layer 202 is described with reference to FIGS. 3C and 3D.

Here, graphene in this specification includes single-layer graphene and multilayer graphene including two to hundred layers. Single-layer graphene refers to a sheet of a monolayer of carbon molecules. Graphene oxide refers to a compound formed by oxidation of such graphene. When graphene oxide is reduced to form graphene, oxygen contained in the graphene oxide is not entirely extracted and part of the oxygen remains in the graphene. When the graphene contains oxygen, the proportion of oxygen is higher than or equal to 2 atomic % and lower than or equal to 20 atomic %, preferably higher than or equal to 3 atomic % and lower than or equal to 15 atomic %.

Here, in the case of reducing multilayer graphene oxide to obtain multilayer graphene, an interlayer distance of the multilayer graphene is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In other words, the multilayer graphene used in a power storage device of one embodiment of the present invention can have an interlayer distance longer than 0.34 nm that is the interlayer distance of general graphite. Since the multilayer graphene used in the power storage device of one embodiment of the present invention can have a long interlayer distance, carrier ions can easily transfer between layers of the multilayer graphene.

Figure 3C:
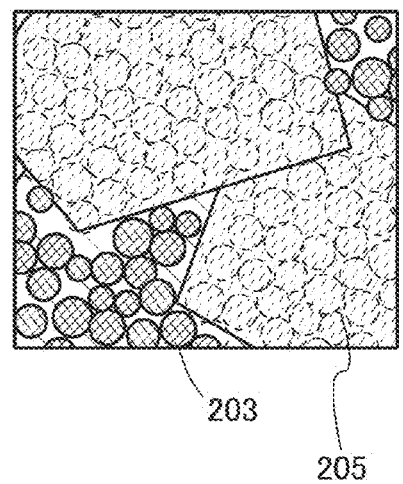

FIG. 3C is a plan view of part of the negative electrode active material layer 202 using graphene. The negative electrode active material layer 202 includes the particulate negative electrode active material 203 having the inorganic compound film on part of its surface and graphenes 205 which cover a plurality of particles of the negative electrode active material 203 and at least partly surround the plurality of particles of negative electrode active material 203. In addition, the negative electrode active material layer 202 includes the particulate negative electrode active material having the inorganic compound film on part of its surface and the film (not illustrated) which is in contact with an exposed portion of the negative electrode active material, the inorganic compound film, and the graphene. The binder which is not illustrated may be added. However, the binder is not necessarily added in the case where the graphenes 205 are contained so that they are bound to each other to be fully functional as a binder. The different graphenes 205 cover surfaces of the plurality of particles of the negative electrode active material 203 in the negative electrode active material layer 202 in the plan view. The particles of the negative electrode active material 203 may partly be exposed.

Figure 3D:
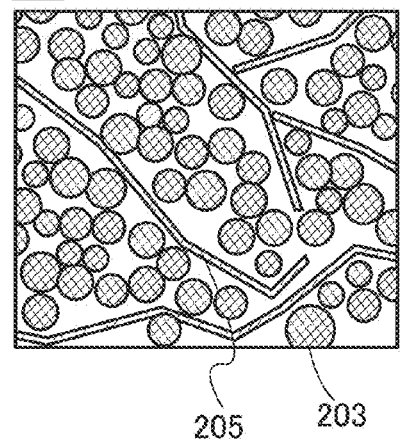

FIG. 3D is a cross-sectional view of part of the negative electrode active material layer 202 in FIG. 3C. In FIG. 3D, the graphenes 205 cover a plurality of particles of the negative electrode active material 203 in the negative electrode active material layer 202 in the plan view. The graphenes 205 are observed to have linear shapes in the cross-sectional view. One graphene or plural graphenes overlap with the plurality of particles of the negative electrode active material 203, or the plurality of particles of the negative electrode active material 203 exists within one graphene or plural graphenes. Note that the graphene 205 has a bag-like shape and the plurality of particles of the negative electrode active material is at least partly surrounded with the bag-like portion in some cases. The graphene 205 partly has openings where the particles of the negative electrode active material 203 are exposed in some cases.

The desired thickness of the negative electrode active material layer 202 is determined in the range of 20 μm to 150 μm.

Note that the negative electrode active material layer 202 may be predoped with lithium. Predoping with lithium may be performed in such a manner that a lithium layer is formed on a surface of the negative electrode active material layer 202 by a sputtering method. Alternatively, lithium foil is provided on the surface of the negative electrode active material layer 202, whereby the negative electrode active material layer 202 can be predoped with lithium.

As an example of the negative electrode active material 203, there is a material whose volume is increased by occlusion of carrier ions. Thus, the negative electrode active material layer containing such a material gets friable and is partly broken due to charge and discharge, which reduces the reliability (e.g., cycle performance) of the power storage device. However, even when the volume of the negative electrode active material increases due to charge and discharge, the graphene partly covers the periphery of the negative electrode active material, which allows prevention of dispersion of the particles of the negative electrode active material and the breakdown of the negative electrode active material layer. That is to say, the graphene has a function of maintaining the bond between the particles of the negative electrode active material even when the volume of the negative electrode active material fluctuates due to charge and discharge.

The graphene 205 has conductivity and is in contact with the plurality of particles of the negative electrode active material 203; thus, it also serves as a conductive additive. That is, a conductive additive does not have to be mixed into forming the negative electrode active material layer 202. Accordingly, the proportion of the negative electrode active material in the negative electrode active material layer 202 with certain weight (certain volume) can be increased, leading to an increase in capacity per unit weight (unit volume) of the electrode.

Further, the graphene 205 efficiently forms a sufficient conductive path of electrons in the negative electrode active material layer 202, which increases the conductivity of the negative electrode for a power storage device.

Note that the graphene 205 also functions as a negative electrode active material that can occlude and release carrier ions, leading to an increase in capacity of the negative electrode for a power storage device which is formed later.

Next, a method for forming the negative electrode active material layer 202 in FIGS. 3C and 3D is described.

First, the particulate negative electrode active material 203 having the inorganic compound film on part of its surface, which is described in Embodiment 1 or 2, and a dispersion liquid containing graphene oxide are mixed to form slurry.

Next, the slurry is applied to one or both of surfaces of the negative electrode current collector 201, and is dried. Then, rolling with a roller press machine is performed.

Then, the graphene oxide is electrochemically reduced with electric energy or thermally reduced by heat treatment to form the graphene 205. In addition, a structure body for a negative electrode including the negative electrode current collector 201 and the particulate negative electrode active material having the inorganic compound film on part of its surface is formed. Particularly in the case of performing electrochemical reduction treatment, a proportion of $C(\pi)$—$C(\pi)$ double bonds of graphene formed by the electrochemical reduction treatment is higher than that of graphene formed by heat treatment; therefore, the graphene 205 having high conductivity can be formed.

Next, the structure body for a negative electrode and the reference electrode of lithium or the like are immersed in the electrolyte solution described later, and voltage is applied to the negative electrode current collector 201 and the reference electrode. As a result, in the structure body for a negative electrode, a film is formed on an exposed portion of the negative electrode active material and the inorganic compound film, which are in contact with the electrolyte solution. In other words, the negative electrode 200 in which the negative electrode active material layer, which includes the particulate negative electrode active material having the inorganic compound film on part of its surface, the graphene, and the film in contact with the exposed portion of the negative electrode active material, the inorganic compound film, and the graphene, is provided over the negative electrode current collector 201 can be formed.

Through the above steps, the negative electrode active material layer 202 in which the graphene is used as a conductive additive can be formed on one or both of the surfaces of the negative electrode current collector 201, and thus the negative electrode 200 can be formed.

Next, a positive electrode and a method for forming the positive electrode method are described with reference to FIGS. 4A to 4C.

Figure 4A:
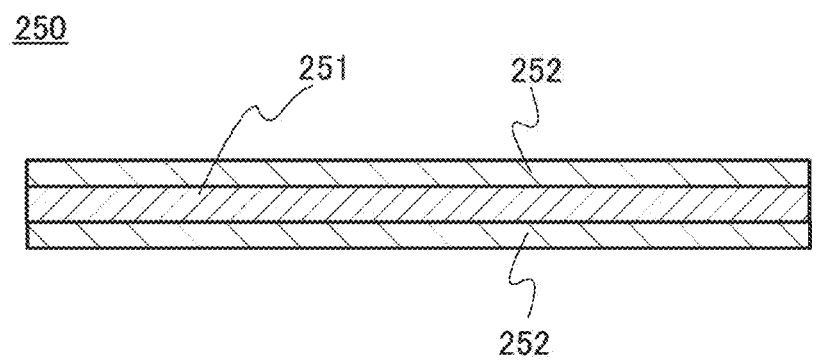
FIGS. 4A to 4C illustrate a positive electrode.

FIG. 4A is a cross-sectional view of a positive electrode 250. In the positive electrode 250, a positive electrode active material layer 252 is formed over a positive electrode current collector 251.

For the positive electrode current collector 251, a highly conductive material such as a metal typified by stainless steel, gold, platinum, zinc, iron, copper, aluminum, or titanium, or an alloy of these metals can be used. Note that the positive electrode current collector 251 can be formed using an aluminum-alloy to which an element which improves heat resistance, such as silicon, titanium, neodymium, scandium, or molybdenum, is added. Further alternatively, the positive electrode current collector 251 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 251 can have a foil-like shape, a plate-like shape (a sheet-like shape), a net-like shape, a punching-metal shape, an expanded-metal shape, or the like as appropriate.

In addition to a positive electrode active material, a conductive additive and a binder may be included in the positive electrode active material layer 252.

As the positive electrode active material of the positive electrode active material layer 252, a material that can insert and extract carrier ions such as lithium ions can be used. For example, a lithium-containing composite oxide with an olivine crystal structure, a layered rock-salt crystal structure, or a spinel crystal structure can be given as the positive electrode active material that can insert and extract lithium ions.

As the lithium-containing composite oxide with an olivine crystal structure, a composite oxide (represented by a general formula $LiMPO_4$ (M is one or more of Fe(II), Mn(II), Co(II), and Ni(II))) can be given. Typical examples of the general formula $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), $LiFe_fNi_gCo_hMn_iPO_4$ (f+g+h+i≤1, 0<f<1, 0<g<1, 0<h<1, and 0<i<1), and the like.

$LiFePO_4$ is particularly preferable because it meets requirements with balance for a positive electrode active material, such as safety, stability, high capacity density, high potential, and the existence of lithium ions that can be extracted in initial oxidation (charging).

Examples of the lithium-containing composite oxide with a layered rock-salt crystal structure include lithium cobalt oxide ($LiCoO_2$); $LiNiO_2$; $LiMnO_2$; $Li_2MnO_3$; an NiCo-based lithium-containing composite oxide (a general formula thereof is $LiNi_xCo_{1-x}O_2$ (0<x<1)) such as $LiNi_{0.8}Co_{0.2}O_2$; an NiMn-based lithium-containing composite oxide (a general formula thereof is $LiNi_xMn_{1-x}O_2$ (0<x<1)) such as $LiNi_{0.5}Mn_{0.5}O_2$; and an NiMnCo-based lithium-containing composite oxide (also referred to as NMC, and a general formula thereof is $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$—$LiMO_2$ (M=Co, Ni, or Mn), and the like can be given.

$LiCoO_2$ is particularly preferable because it has high capacity, is more stable in the air than $LiNiO_2$, and is more thermally stable than $LiNiO_2$, for example.

Examples of the lithium-containing composite oxide with a spinel crystal structure include $LiMn_2O_4$, $Li_{1+x}Mn_{2-x}O_4$, $Li(MnAl)_2O_4$, $LiMn_{1.5}Ni_{0.5}O_4$, and the like.

A lithium-containing composite oxide with a spinel crystal structure including manganese, such as $LiMn_2O_4$, is preferably mixed with a small amount of lithium nickel oxide (e.g., $LiNiO_2$ or $LiNi_{1-x}MO_2$ (M=Co, Al, or the like)), in which case elution of manganese and decomposition of an electrolyte solution are suppressed, for example.

Alternatively, as the positive electrode active material, a composite oxide represented by a general formula $Li_{(2-j)}MSiO_4$ (M is one or more of Fe(II), Mn(II), Co(II), and Ni(II); 0≤j 2) can be used. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_q$ SiO$_4$ (m+n+q≤1, 0<m<1, 0<n<1, and 0<q<1), Li$_{(2-j)}$Fe$_r$Ni$_s$Co$_t$Mn$_u$SiO$_4$ (r+s+t+u≤1, 0<r<1, 0<s<1, 0<t<1, and 0<u<1), and the like.

Further alternatively, as the positive electrode active material, a nasicon compound represented by a general formula A$_x$M$_2$(XO$_4$)$_3$ (A=Li, Na, or Mg; M=Fe, Mn, Ti, V, Nb, or Al; and X=S, P, Mo, W, As, or Si) can be used. Examples of the nasicon compound include Fe$_2$(MnO$_4$)$_3$, Fe$_2$(SO$_4$)$_3$, Li$_3$Fe$_2$(PO$_4$)$_3$, and the like. Still further alternatively, as the positive electrode active material, a compound represented by a general formula Li$_2$MPO$_4$F, Li$_2$MP$_2$O$_7$, or Li$_5$MO$_4$ (M=Fe or Mn); perovskite fluoride such as NaF$_3$ or FeF$_3$; metal chalcogenide such as TiS$_2$ or MoS$_2$ (sulfide, selenide, or telluride); a lithium-containing composite oxide with an inverse spinel crystal structure such as LiMVO$_4$; a vanadium oxide based material (e.g., V$_2$O$_5$, V$_6$O$_{13}$, or LiV$_3$O$_8$); a manganese oxide based material; an organic sulfur based material; or the like can be used.

In the case where carrier ions are alkali metal ions other than lithium ions, alkaline-earth metal ions, beryllium ions, or magnesium ions, the positive electrode active material layer 252 may contain, instead of lithium in the lithium compound and the lithium-containing composite oxide, an alkali metal (e.g., sodium or potassium), an alkaline-earth metal (e.g., calcium, strontium, or barium), beryllium, or magnesium.

The positive electrode active material layer 252 is not necessarily formed in contact with the positive electrode current collector 251. Between the positive electrode current collector 251 and the positive electrode active material layer 252, any of the following functional layers may be formed using a conductive material such as a metal: an adhesive layer for the purpose of improving adhesiveness between the positive electrode current collector 251 and the positive electrode active material layer 252, a planarization layer for reducing unevenness of the surface of the positive electrode current collector 251, a heat radiation layer for radiating heat, and a stress relaxation layer for relieving stress of the positive electrode current collector 251 or the positive electrode active material layer 252.

Figure 4B:
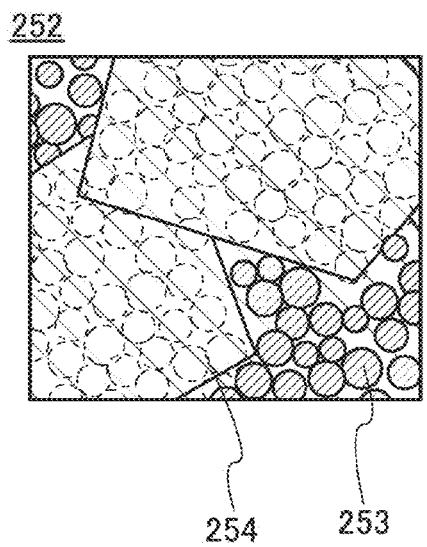

FIG. 4B is a plan view of the positive electrode active material layer 252. As the positive electrode active material layer 252, a particulate positive electrode active material 253 that can occlude and release carrier ions is used. An example is shown in which graphenes 254 covering a plurality of particles of the positive electrode active material 253 and at least partly surrounding the plurality of particles of the positive electrode active material 253 are included. The different graphenes 254 cover surfaces of the plurality of particles of the positive electrode active material 253. The particles of the positive electrode active material 253 may partly be exposed.

The size of the particle of the positive electrode active material 253 is preferably greater than or equal to 20 nm and less than or equal to 100 nm. Note that the size of the particle of the positive electrode active material 253 is preferably smaller because electrons transfer in the positive electrode active material 253.

Although sufficient characteristics can be obtained even when the surface of the positive electrode active material 253 is not covered with a graphite layer, graphene and a positive electrode active material covered with a graphite layer are preferably used, in which case hopping of carrier ions occurs between particles of the positive electrode active material, so that current flows.

Figure 4C:
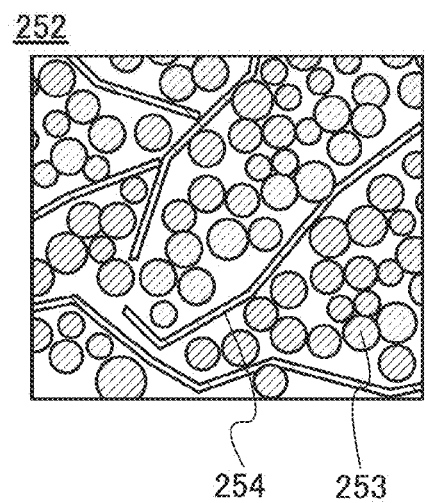

FIG. 4C is a cross-sectional view of part of the positive electrode active material layer 252 in FIG. 4B. The positive electrode active material layer 252 includes the positive electrode active material 253 and the graphenes 254 covering a plurality of particles of the positive electrode active material 253. The graphene 254 has a linear shape when observed in the cross-sectional view. The plurality of particles of the positive electrode active material is at least partly surrounded with one graphene or plural graphenes, or the plurality of particles of the positive electrode active material exists within one graphene or plural graphenes. Note that the graphene has a bag-like shape and the plurality of particles of the positive electrode active material is at least partly surrounded with the bag-like portion in some cases. In addition, the particles of the positive electrode active material are partly not covered with the graphenes and exposed in some cases.

The desired thickness of the positive electrode active material layer 252 is determined in the range of 20 µm to 100 µm. It is preferable to adjust the thickness of the positive electrode active material layer 252 as appropriate so that cracks and separation do not occur.

Note that the positive electrode active material layer 252 may contain a known conductive additive, for example, acetylene black particles having a volume 0.1 to 10 times as large as that of the graphene or carbon particles such as carbon nanofibers having a one-dimensional expansion.

As an example of a material of the positive electrode active material, a material whose volume is increased by occlusion of ions serving as carriers is given. When such a material is used, the positive electrode active material layer gets friable and is partly broken due to charge and discharge, which results in lower reliability of the power storage device. However, even when the volume of the positive electrode active material is increased due to charge and discharge, the graphene partly covers the periphery of the positive electrode active material, which allows prevention of dispersion of the particles of the positive electrode active material and the breakdown of the positive electrode active material layer. That is to say, the graphene has a function of maintaining the bond between the particles of the positive electrode active material even when the volume of the positive electrode active material fluctuates due to charge and discharge.

The graphene 254 is in contact with the plurality of particles of the positive electrode active material 253 and serves also as a conductive additive. Further, the graphene 254 has a function of holding the positive electrode active material capable of occluding and releasing carrier ions. Thus, a binder does not have to be mixed into the positive electrode active material layer. Accordingly, the amount of the positive electrode active material in the positive electrode active material layer can be increased, which allows an increase in capacity of the power storage device.

Next, description is given of a method for forming the positive electrode active material layer 252.

First, slurry containing the particulate positive electrode active material and graphene oxide is formed. Next, the slurry is applied onto the positive electrode current collector 251. Then, heating is performed in a reduced atmosphere for reduction treatment so that the positive electrode active material is baked and oxygen included in the graphene oxide is extracted to form graphene. Note that oxygen in the graphene oxide is not entirely extracted and partly remains in the graphene. Through the above steps, the positive electrode active material layer 252 can be formed over the positive electrode current collector 251. Consequently, the positive electrode active material layer 252 has higher conductivity.

Graphene oxide contains oxygen and thus is negatively charged in a polar solvent. As a result of being negatively charged, graphene oxide is dispersed in the polar solvent. Therefore, the particles of the positive electrode active material contained in the slurry are not easily aggregated, so that an increase in the size of the particle of the positive electrode active material due to aggregation can be prevented. Thus, the transfer of electrons in the positive electrode active material is facilitated, resulting in an increase in conductivity of the positive electrode active material layer.

Next, the power storage device and a method for manufacturing the power storage device are described. Here, a structure and a method for manufacturing a lithium ion battery, which is one mode of the power storage device, are described with reference to FIGS. 5A and 5B. Here, a cross-sectional structure of the lithium ion battery is described below.

(Coin-type Lithium Ion Battery)

Figure 5A:
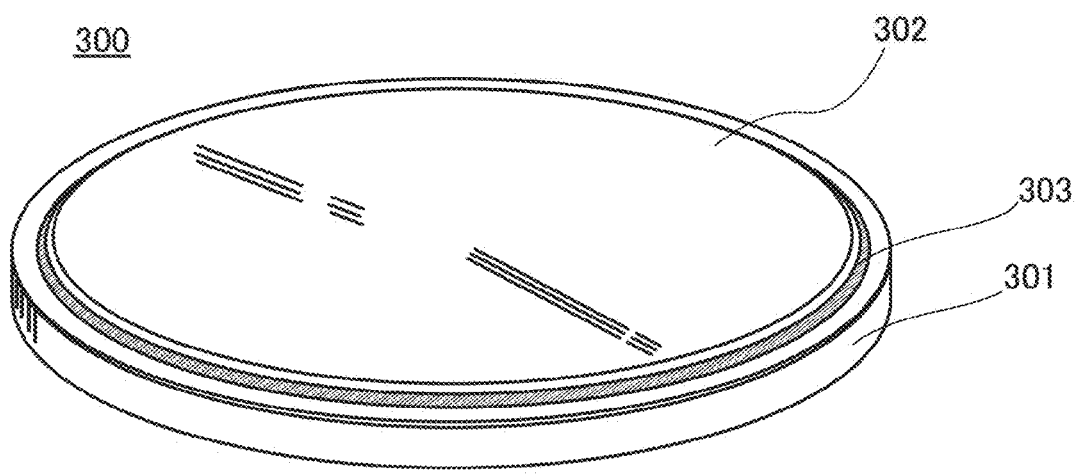
FIGS. 5A and 5B illustrate a coin-type lithium ion battery.
Figure 5B:
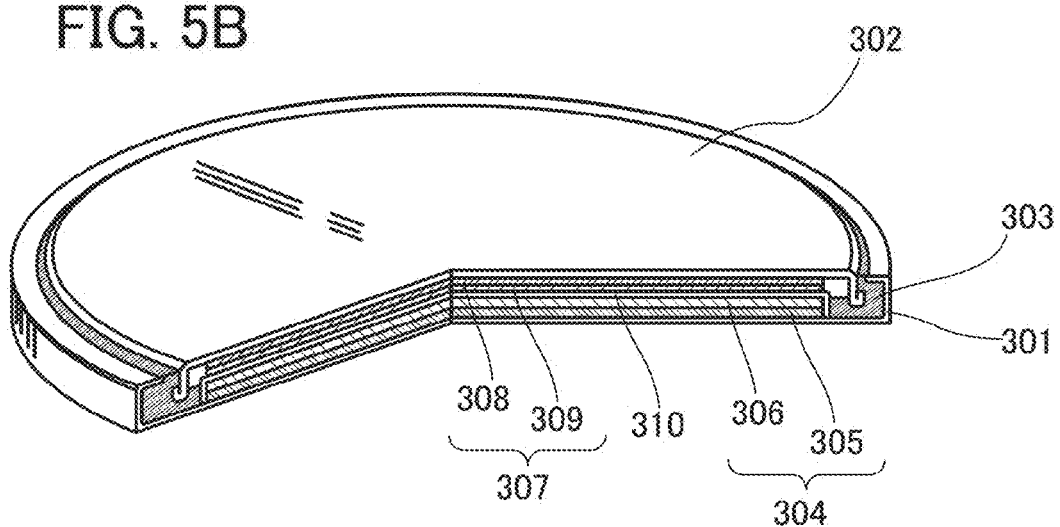

FIG. 5A is an external view of a coin-type (single-layer flat type) lithium ion battery, and FIG. 5B is a cross-sectional view thereof.

In a coin-type lithium ion battery 300, a positive electrode can 301 serving also as a positive electrode terminal and a negative electrode can 302 serving also as a negative electrode terminal are insulated and sealed with a gasket 303 formed of polypropylene or the like. A positive electrode 304 includes a positive electrode current collector 305 and a positive electrode active material layer 306 which is provided to be in contact with the positive electrode current collector 305. A negative electrode 307 includes a negative electrode current collector 308 and a negative electrode active material layer 309 which is provided to be in contact with the negative electrode current collector 308. A separator 310 and an electrolyte solution (not illustrated) are included between the positive electrode active material layer 306 and the negative electrode active material layer 309.

As the negative electrode 307, the negative electrode 10 described in Embodiment 1 is used. As the positive electrode 304, the positive electrode 250 described in this embodiment can be used.

For the separator 310, an insulator such as cellulose (paper), polypropylene with pores, or polyethylene with pores can be used.

As an electrolyte of the electrolyte solution, a material which contains carrier ions is used. Typical examples of the electrolyte include lithium salts such as $LiClO_4$, $LiAsF_6$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, $LiN(C_2F_5SO_2)_2$, and the like.

In the case where carrier ions are alkali metal ions other than lithium ions, alkaline-earth metal ions, beryllium ions, or magnesium ions, the electrolyte may contain, instead of lithium in the lithium salts, an alkali metal (e.g., sodium or potassium), an alkaline-earth metal (e.g., calcium, strontium, or barium), beryllium, or magnesium.

As a solvent for the electrolyte solution, a material that can transfer carrier ions is used. As the solvent for the electrolyte solution, an aprotic organic solvent is preferably used. Typical examples of the aprotic organic solvent include ethylene carbonate (EC), propylene carbonate, butylene carbonate, chloroethylene carbonate, vinylene carbonate, dimethyl carbonate, diethyl carbonate (DEC), ethyl methyl carbonate (EMC), γ-butyrolactone, γ-valerolactone, methyl formate, methyl acetate, methyl butyrate, 1,3-dioxane, 1,4-dioxane, dimethyl sulfoxide, diethyl ether, methyl diglyme, acetonitrile, benzonitrile, dimethoxyethane, tetrahydrofuran, sulfolane, and sultone, and one or more of these materials can be used. When a gelled high-molecular material is used as the solvent for the electrolyte solution, safety against liquid leakage and the like is improved. Further, a lithium ion battery can be thinner and more lightweight. Typical examples of the gelled high-molecular material include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which are less likely to burn and volatilize as the solvent for the electrolyte solution can prevent a lithium ion battery from exploding or catching fire even when the lithium ion battery internally shorts out or the internal temperature increases due to overcharging or the like.

Instead of the electrolyte solution, a solid electrolyte including a sulfide-based inorganic material, an oxide-based inorganic material, or the like, or a solid electrolyte including a polyethylene oxide (PEO)-based high-molecular material or the like can be used. In the case of using the solid electrolyte, a separator is not necessary. Further, the battery can be entirely solidified; therefore, there is no possibility of liquid leakage and thus the safety of the battery is dramatically increased.

For the positive electrode can 301 and the negative electrode can 302, a metal having a corrosion-resistant property to a liquid (e.g., an electrolyte solution) in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 301 and the negative electrode can 302 are electrically connected to the positive electrode 304 and the negative electrode 307, respectively.

Next, the method for manufacturing the power storage device is described.

The negative electrode 307, the positive electrode 304, and the separator 310 are immersed in the electrolyte solution. Then, as illustrated in FIG. 5B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 provided therebetween. In such a manner, the coin-type lithium ion battery 300 is manufactured.

Note that instead of the negative electrode 307, the structure body for a negative electrode described in the method for forming the negative electrode 200 illustrated in FIGS. 3A to 3D is used, and the structure body, the positive electrode 304, and a separator are immersed in an electrolyte solution. A positive electrode can, the positive electrode, the separator, the structure body for a negative electrode, and a negative electrode can are stacked in this order with the positive electrode can positioned at the bottom. The positive electrode can and the negative electrode can are subjected to pressure bonding with a gasket provided therebetween. Next, voltage within a predetermined range is applied to the positive electrode can and the negative electrode can to perform charge and discharge, so that due to a reductive decomposition reaction of the electrolyte solution, in the structure body for a negative electrode, a film is formed on an exposed portion of the negative electrode active material and the inorganic compound film, which are in contact with the electrolyte solution. In other words, the negative electrode 307 in which the negative electrode active material layer, which includes the particulate negative electrode active material having the inorganic compound film on part of its surface and the film in contact with the exposed portion of the negative electrode active material and the inorganic compound film, is provided over the negative electrode current collector can be formed and the coin-type lithium ion battery 300 can be manufactured. In the method for manufacturing the lithium ion battery, the negative electrode can be formed while the lithium ion battery is manufactured, which makes it possible to reduce the number of manufacturing steps of the lithium ion battery.

(Laminated Lithium Ion Battery)

Next, an example of a laminated lithium ion battery is described with reference to FIG. 6.

Figure 6:
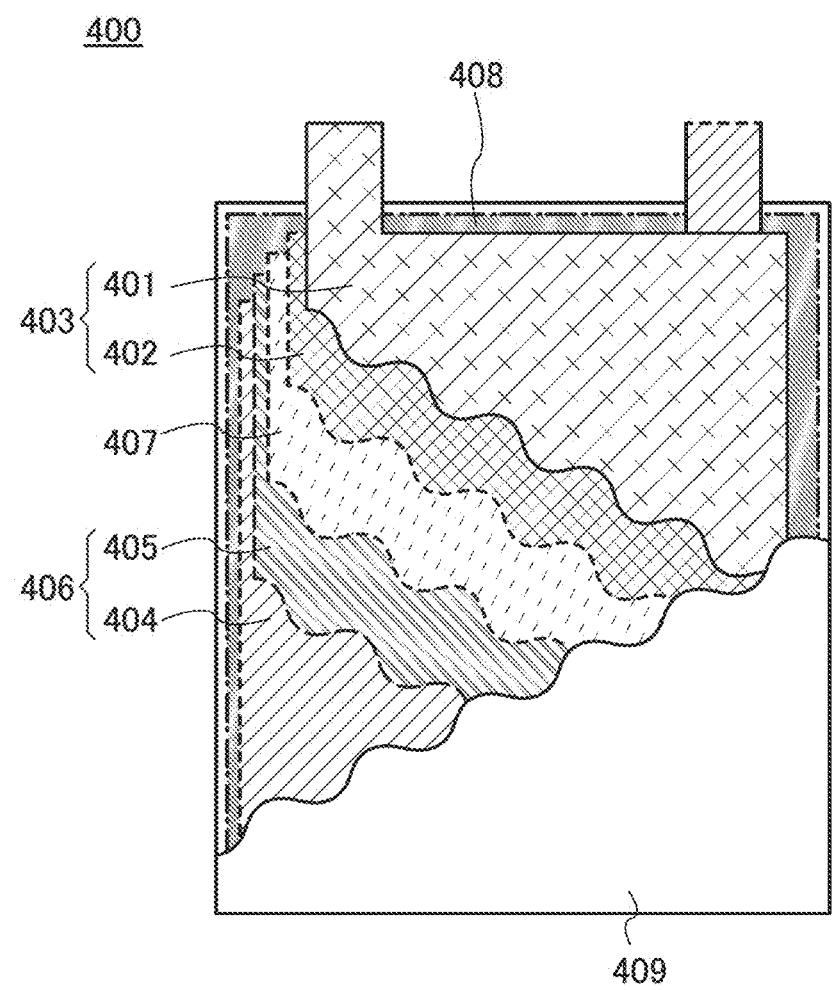
FIG. 6 illustrates a laminated lithium ion battery.

In a laminated lithium ion battery 400 illustrated in FIG. 6, a positive electrode 403 including a positive electrode current collector 401 and a positive electrode active material layer 402, a separator 407, and a negative electrode 406 including a negative electrode current collector 404 and a negative electrode active material layer 405 are stacked and sealed in an exterior body 409, and then an electrolyte solution 408 is injected into the exterior body 409. Although the laminated lithium ion battery 400 in FIG. 6 has a structure where one sheet-like positive electrode 403 and one sheet-like negative electrode 406 are stacked, it is preferable to roll the stack or to stack a plurality of pieces of the stacks and then laminate them in order to increase battery capacity. Particularly in the case of the laminated lithium ion battery, the battery has flexibility and thus is suitable for applications which require flexibility.

In the laminated lithium ion battery 400 illustrated in FIG. 6, the positive electrode current collector 401 and the negative electrode current collector 404 serve as terminals for an electrical contact with the outside. For this reason, the positive electrode current collector 401 and the negative electrode current collector 404 are arranged so that part of the positive electrode current collector 401 and part of the negative electrode current collector 404 are exposed outside the exterior body 409.

As the exterior body 409 in the laminated lithium ion battery 400, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of an electrolytic solution and a gas can be blocked and an insulating property and resistance to the electrolytic solution can be provided.

Note that in the laminated lithium ion battery 400, the positive electrode 403 and the negative electrode 406 may be formed in a manner similar to those of the positive electrode and the negative electrode in the above coin-type lithium ion battery.

(Cylindrical Lithium Ion Battery)

Figures 7A, 7B:
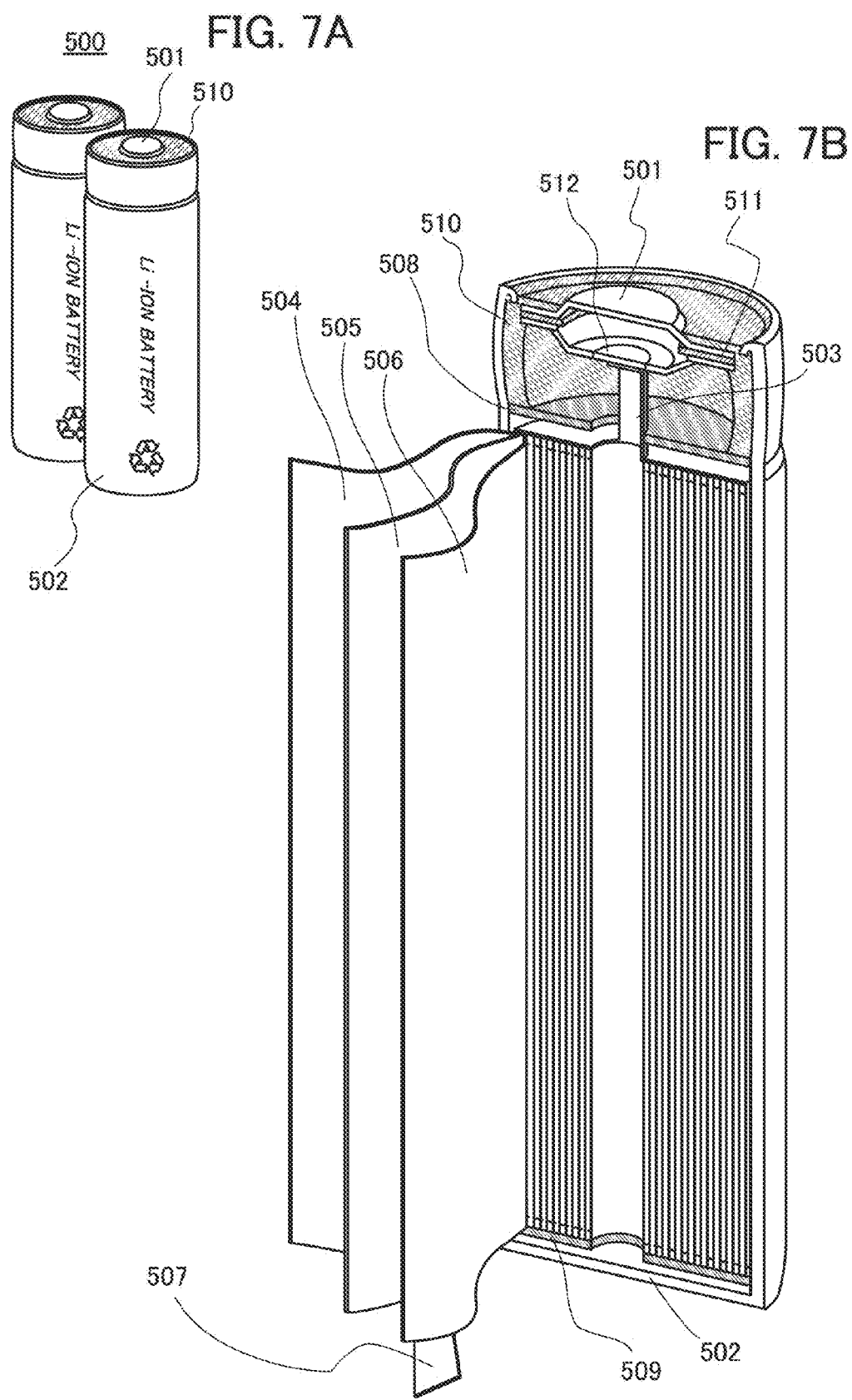
FIGS. 7A and 7B illustrate a cylindrical lithium ion battery.

Next, an example of a cylindrical lithium ion battery is described with reference to FIGS. 7A and 7B. As illustrated in FIG. 7A, a cylindrical lithium ion battery 500 includes a positive electrode cap (battery lid) 501 on its top surface and a battery can (exterior can) 502 on its side surface and bottom surface. The positive electrode cap 501 and the battery can 502 are insulated from each other by a gasket 510 (insulating packing).

FIG. 7B is a diagram schematically illustrating a cross section of the cylindrical lithium ion battery. In the battery can 502 with a hollow cylindrical shape, a battery element is provided in which a strip-like positive electrode 504 and a strip-like negative electrode 506 are wound with a separator 505 provided therebetween. Although not illustrated, the battery element is wound around a center pin as a center. One end of the battery can 502 is close and the other end thereof is open. For the battery can 502, a metal having a corrosion-resistant property to a liquid (e.g., an electrolyte solution) in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 502, the battery element in which the positive electrode, the negative electrode, and the separator are wound is provided between a pair of insulating plates 508 and 509 which face each other. Further, an electrolyte solution (not illustrated) is injected inside the battery can 502 in which the battery element is provided. An electrolyte solution which is similar to that of the coin-type lithium ion battery or the laminated lithium ion battery can be used.

Although the positive electrode 504 and the negative electrode 506 can be formed in a manner similar to those of the positive electrode and the negative electrode of the coin-type lithium ion battery, the difference lies in that, since the positive electrode and the negative electrode of the cylindrical lithium ion battery are wound, active materials are formed on both sides of the current collectors. A positive electrode terminal (positive electrode current collecting lead) 503 is connected to the positive electrode 504, and a negative electrode terminal (negative electrode current collecting lead) 507 is connected to the negative electrode 506. A metal material such as aluminum can be used for both the positive electrode terminal 503 and the negative electrode terminal 507. The positive electrode terminal 503 is resistance-welded to a safety valve mechanism 512, and the negative electrode terminal 507 is resistance-welded to the bottom of the battery can 502. The safety valve mechanism 512 is electrically connected to the positive electrode cap 501 through a positive temperature coefficient (PTC) element 511. The safety valve mechanism 512 cuts off electrical connection between the positive electrode cap 501 and the positive electrode 504 when the internal pressure of the battery increases and exceeds a predetermined threshold value. The PTC element 511 is a heat sensitive resistor whose resistance increases as temperature rises, and controls the amount of current by increase in resistance to prevent unusual heat generation. Barium titanate ($BaTiO_3$)-based semiconductor ceramic or the like can be used for the PTC element.

Note that in this embodiment, the coin-type lithium ion battery, the laminated lithium ion battery, and the cylindrical lithium ion battery are given as examples of the lithium ion battery; however, any of lithium ion batteries with various shapes, such as a sealing-type lithium ion battery and a square-type lithium ion battery, can be used. Further, a structure in which a plurality of positive electrodes, a plurality of negative electrodes, and a plurality of separators are stacked or wound may be employed.

The negative electrode for a power storage device which is one embodiment of the present invention is used as the negative electrode in each of the lithium ion battery 300, the lithium ion battery 400, and the lithium ion battery 500 described in this embodiment. Thus, the lithium ion battery 300, the lithium ion battery 400, and the lithium ion battery 500 can have favorable long-term cycle performance.

This embodiment can be implemented in combination with any of the other embodiments as appropriate.

(Embodiment 4)

In this embodiment, a lithium ion capacitor is described as a power storage device.

The lithium ion capacitor is a hybrid capacitor which combines a positive electrode of an electrical double layer capacitor (EDLC) and a negative electrode of a lithium ion battery using a carbon material, and is also an asymmetric capacitor in which the principles of power storage are different between the positive electrode and the negative electrode. The positive electrode forms an electrical double layer and enables charge and discharge by a physical action, whereas the negative electrode enables charge and discharge by a chemical action of lithium. With the use of a negative electrode in which lithium is occluded in a negative electrode active material such as a carbon material in advance, the lithium ion capacitor can have energy density dramatically higher than that of a conventional electrical double layer capacitor including a negative electrode using active carbon.

In the lithium ion capacitor, instead of the positive electrode active material layer in any of the lithium ion battery described in Embodiment 3, a material that can occlude at least one of lithium ions and anions reversibly may be used. Examples of such a material include active carbon, a conductive high molecule, a polyacene-based organic semiconductor (PAS), and the like.

The lithium ion capacitor has high efficiency of charge and discharge, capability of rapidly performing charge and discharge, and a long life even when it is repeatedly used.

As the negative electrode of such a lithium ion capacitor, the negative electrode for a power storage device which is described in Embodiment 1 is used. Thus, a decomposition reaction of an electrolyte solution and the like caused as a side reaction of charge and discharge can be minimized and therefore, a power storage device having long-term cycle performance can be manufactured.

This embodiment can be implemented in combination with any of the other embodiments as appropriate.

(Embodiment 5)

A power storage device of one embodiment of the present invention can be used as a power supply of various electronic appliances which are driven by electric power.

Specific examples of electronic appliances each using the power storage device of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, mobile phones, car phones, portable game machines, calculators, portable information terminals, electronic notebooks, e-book readers, electronic translators, audio input devices, video cameras, digital still cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, and medical equipment such as dialyzers. The examples also include industrial equipment such as guide lights, traffic lights, belt conveyors, elevators, escalators, industrial robots, power storage systems, and power storage devices for leveling the amount of power supply and smart grid. In addition, moving objects driven by an electric motor using power from a power storage device are also included in the category of electronic appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the above electronic appliances, the power storage device of one embodiment of the present invention can be used as a main power source for supplying enough power for almost the whole power consumption. Alternatively, in the above electronic appliances, the power storage device of one embodiment of the present invention can be used as an uninterruptible power source which can supply power to the electronic appliances when the supply of power from the main power source or a commercial power source is stopped. Still alternatively, in the above electronic appliances, the power storage device of one embodiment of the present invention can be used as an auxiliary power source for supplying power to the electronic appliances at the same time as the power supply from the main power source or a commercial power source.

Figure 8:
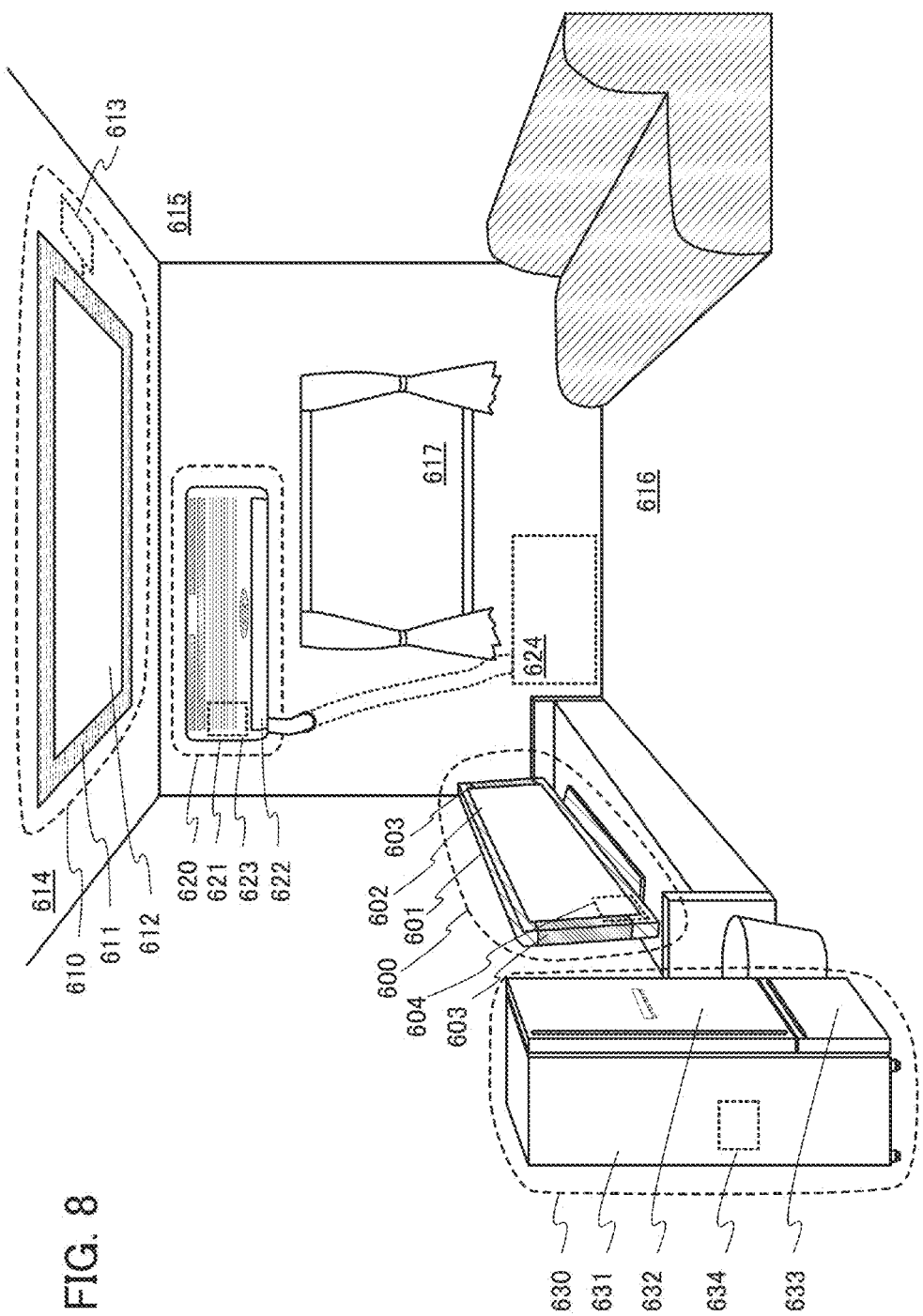
FIG. 8 illustrates electronic appliances.

FIG. 8 illustrates specific structures of the electronic appliances. In FIG. 8, a display device 600 is an example of an electronic appliance using a power storage device 604 of one embodiment of the present invention. Specifically, the display device 600 corresponds to a display device for TV broadcast reception and includes a housing 601, a display portion 602, speaker portions 603, the power storage device 604, and the like. The power storage device 604 of one embodiment of the present invention is provided in the housing 601. The display device 600 can receive power from a commercial power source. Alternatively, the display device 600 can use power stored in the power storage device 604. Thus, the display device 600 can be operated with the use of the power storage device 604 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 602.

Note that the display device includes, in its category, all of information display devices for personal computers, advertisement displays, and the like in addition to TV broadcast reception.

In FIG. 8, an installation lighting device 610 is an example of an electronic appliance using a power storage device 613 of one embodiment of the present invention. Specifically, the installation lighting device 610 includes a housing 611, a light source 612, the power storage device 613, and the like. Although FIG. 8 illustrates the case where the power storage device 613 is provided in a ceiling 614 on which the housing 611 and the light source 612 are installed, the power storage device 613 may be provided in the housing 611. The installation lighting device 610 can receive power from a commercial power source. Alternatively, the installation lighting device 610 can use power stored in the power storage device 613. Thus, the installation lighting device 610 can be operated with the use of the power storage device 613 of one embodiment of the present invention as an uninterruptible power source even when power cannot be supplied from a commercial power source due to power failure or the like.

Note that although the installation lighting device 610 provided in the ceiling 614 is illustrated in FIG. 8 as an example, the power storage device of one embodiment of the present invention can be used as an installation lighting device provided in, for example, a wall 615, a floor 616, a window 617, or the like other than the ceiling 614. Alternatively, the power storage device can be used in a tabletop lighting device or the like.

As the light source 612, an artificial light source which emits light artificially by using power can be used. Specifically, an incandescent lamp, a discharge lamp such as a fluorescent lamp, and a light-emitting element such as an LED and an organic EL element are given as examples of the artificial light source.

In FIG. 8, an air conditioner including an indoor unit 620 and an outdoor unit 624 is an example of an electronic appliance using a power storage device 623 of one embodiment of the present invention. Specifically, the indoor unit 620 includes a housing 621, an air outlet 622, the power storage device 623, and the like. Although FIG. 8 illustrates the case where the power storage device 623 is provided in the indoor unit 620, the power storage device 623 may be provided in the outdoor unit 624. Alternatively, the power storage device 623 may be provided in both the indoor unit 620 and the outdoor unit 624. The air conditioner can receive power from a commercial power source. Alternatively, the air conditioner can use power stored in the power storage device 623. Particularly in the case where the power storage devices 623 are provided in both the indoor unit 620 and the outdoor unit 624, the air conditioner can be operated with the use of the power storage device 623 of one embodiment of the present invention as an uninterruptible power source even when power cannot be supplied from a commercial power source due to power failure or the like.

Note that although the split-type air conditioner including the indoor unit and the outdoor unit is illustrated in FIG. 8 as an example, the power storage device of one embodiment of the present invention can be used in an air conditioner in which the functions of an indoor unit and an outdoor unit are integrated in one housing.

In FIG. 8, an electric refrigerator-freezer 630 is an example of an electronic appliance using a power storage device 634 of one embodiment of the present invention. Specifically, the electric refrigerator-freezer 630 includes a housing 631, a door for a refrigerator 632, a door for a freezer 633, the power storage device 634, and the like. The power storage device 634 is provided inside the housing 631 in FIG. 8. The electric refrigerator-freezer 630 can receive power from a commercial power source. Alternatively, the electric refrigerator-freezer 630 can use power stored in the power storage device 634. Thus, the electric refrigerator-freezer 630 can be operated with the use of the power storage device 634 of one embodiment of the present invention as an uninterruptible power source even when power cannot be supplied from a commercial power source due to power failure or the like.

Note that among the electronic appliances described above, a high-frequency heating apparatus such as a microwave oven and an electronic appliance such as an electric rice cooker require high power in a short time. The tripping of a circuit breaker of a commercial power source in use of electronic appliances can be prevented by using the power storage device of one embodiment of the present invention as an auxiliary power source for supplying power which cannot be supplied enough by a commercial power source.

In addition, in a time period when electronic appliances are not used, particularly when the proportion of the amount of power which is actually used to the total amount of power which can be supplied from a commercial power source (such a proportion referred to as a usage rate of power) is low, power can be stored in the power storage device, whereby the usage rate of power can be reduced in a time period when the electronic appliances are used. For example, in the case of the electric refrigerator-freezer 630, power can be stored in the power storage device 634 in nighttime when the temperature is low and the door for a refrigerator 632 and the door for a freezer 633 are not often opened and closed. On the other hand, in daytime when the temperature is high and the door for a refrigerator 632 and the door for a freezer 633 are frequently opened and closed, the power storage device 634 is used as an auxiliary power source; thus, the usage rate of power in daytime can be reduced.

This embodiment can be implemented in combination with any of the other embodiments as appropriate.

(Embodiment 6)

Next, a portable information terminal which is an example of an electronic appliance is described with reference to FIGS. 9A to 9C.

Figure 9A:
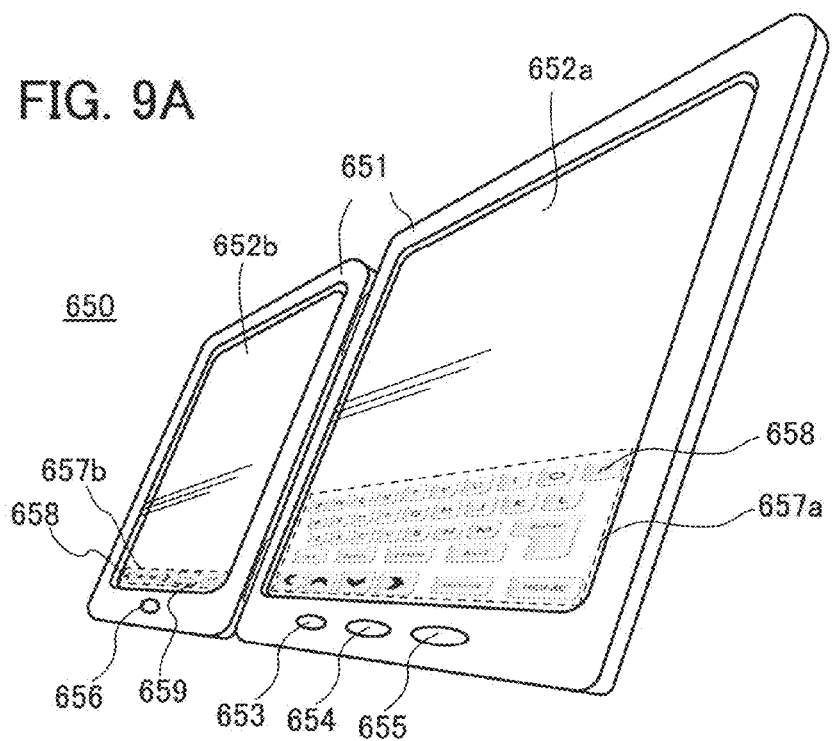
FIGS. 9A to 9C illustrate an electronic appliance.
Figure 9B:
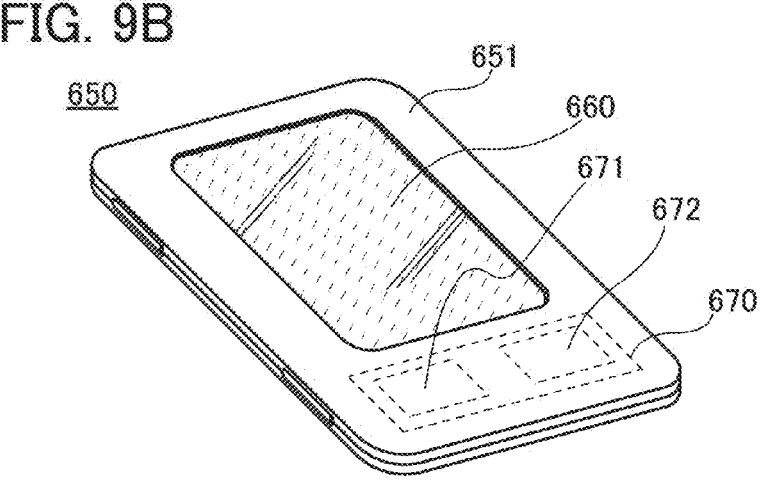

FIGS. 9A and 9B illustrate a tablet terminal 650 that can be folded. FIG. 9A illustrates the tablet terminal 650 in the state of being unfolded. The tablet terminal 650 includes a housing 651, a display portion 652a, a display portion 652b, a switch 653 for switching display modes, a power switch 654, a switch 655 for switching to power-saving-mode, and an operation switch 656.

Part of the display portion 652a can be a touch panel region 657a and data can be input when a displayed operation key 658 is touched. Note that FIG. 9A illustrates, as an example, that half of the area of the display portion 652a has only a display function and the other half of the area has a touch panel function. However, the structure of the display portion 652a is not limited to this, and all the area of the display portion 652a may have a touch panel function. For example, all the area of the display portion 652a can display keyboard buttons and serve as a touch panel while the display portion 652b can be used as a display screen.

Like the display portion 652a, part of the display portion 652b can be a touch panel region 657b. When a finger, a stylus, or the like touches the place where a button 659 for switching to keyboard display is displayed in the touch panel, keyboard buttons can be displayed on the display portion 652b.

Touch input can be performed on the touch panel regions 657a and 657b at the same time.

The switch 653 for switching display modes can switch the display between portrait mode, landscape mode, and the like, and between monochrome display and color display, for example. With the switch 655 for switching to power-saving mode, the luminance of display can be optimized depending on the amount of external light at the time when the tablet terminal is in use, which is detected with an optical sensor incorporated in the tablet terminal. The tablet terminal may include another detection device such as a sensor for detecting orientation (e.g., a gyroscope or an acceleration sensor) in addition to the optical sensor.

Although the display area of the display portion 652a is the same as that of the display portion 652b in FIG. 9A, one embodiment of the present invention is not particularly limited thereto. The display area of the display portion 652a may be different from that of the display portion 652b, and further, the display quality of the display portion 652a may be different from that of the display portion 652b. For example, one of them may be a display panel that can display higher-definition images than the other.

FIG. 9B illustrates the tablet terminal 650 in the state of being closed. The tablet terminal 650 includes the housing 651, a solar cell 660, a charge and discharge control circuit 670, a battery 671, and a DCDC converter 672. Note that FIG. 9B illustrates an example in which the charge and discharge control circuit 670 includes the battery 671 and the DCDC converter 672, and the battery 671 includes the power storage device described in any of the above embodiments.

Since the tablet terminal 650 can be folded, the housing 651 can be closed when the tablet terminal 650 is not in use. Thus, the display portions 652a and 652b can be protected, thereby providing the tablet terminal 650 with excellent endurance and excellent reliability for long-term use.

The tablet terminal illustrated in FIGS. 9A and 9B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 660, which is attached on the surface of the tablet terminal 650, supplies power to the touch panel, the display portion, a video signal processor, and the like. Note that the solar cell 660 is preferably provided on one or two surfaces of the housing 651, in which case the battery 671 can be charged efficiently. The use of the power storage device of one embodiment of the present invention as the battery 671 has advantages such as a reduction is size.

The structure and operation of the charge and discharge control circuit 670 illustrated in FIG. 9B are described with reference to a block diagram in FIG. 9C. The solar cell 660, the battery 671, the DCDC converter 672, a converter 673, switches SW1 to SW3, and the display portion 652 are illustrated in FIG. 9C, and the battery 671, the DCDC converter 672, the converter 673, and the switches SW1 to SW3 correspond to the charge and discharge control circuit 670 illustrated in FIG. 9B.

First, an example of the operation in the case where power is generated by the solar cell 660 using external light is described. The voltage of power generated by the solar cell 660 is raised or lowered by the DCDC converter 672 so that the power has a voltage for charging the battery 671. Then, when the power from the solar cell 660 is used for the operation of the display portion 652, the switch SWI is turned on and the voltage of the power is raised or lowered by the converter 673 so as to be a voltage needed for the display portion 652. In addition, when display on the display portion 652 is not performed, the switch SW1 may be turned off and the switch SW2 may be turned on so that the battery 671 is charged.

Here, the solar cell 660 is described as an example of a power generation means; however, there is no particular limitation on the power generation means, and the battery 671 may be charged with another power generation means such as a piezoelectric element or a thermoelectric conversion element (Peltier element). For example, the battery 671 may be charged with a non-contact power transmission module that transmits and receives power wirelessly (without contact) to charge the battery or with a combination of other charging means.

Figure 9C:
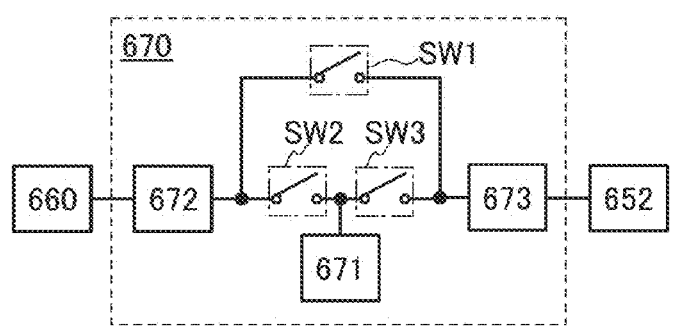

It is needless to say that one embodiment of the present invention is not limited to the electronic appliance illustrated in FIGS. 9A to 9C as long as the electronic appliance is equipped with the power storage device described in any of the above embodiments.

(Embodiment 7)

Further, an example of the moving object which is an example of the electronic appliance is described with reference to FIGS. 10A and 10B.

Any of the power storage device described in any of the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figures 10A, 10B:
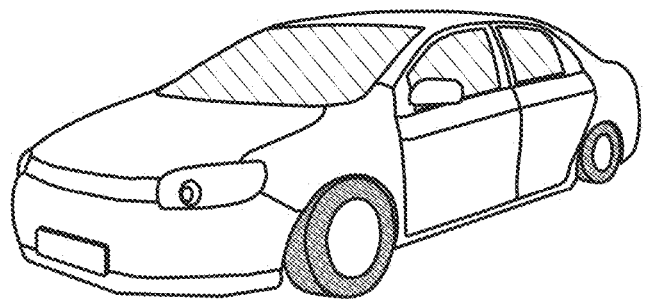
FIGS. 10A and 10B illustrate an electronic appliance.

FIGS. 10A and 10B illustrate an example of an electric vehicle. An electric vehicle 680 is equipped with a battery 681. The output of the power of the battery 681 is adjusted by a control circuit 682 and the power is supplied to a driving device 683. The control circuit 682 is controlled by a processing unit 684 including a ROM, a RAM, a CPU, or the like which is not illustrated.

The driving device 683 includes a DC motor or an AC motor either alone or in combination with an internal-combustion engine. The processing unit 684 outputs a control signal to the control circuit 682 based on input data such as data on operation (e.g., acceleration, deceleration, or stop) by a driver of the electric vehicle 680 or data on driving the electric vehicle 680 (e.g., data on an upgrade or a downgrade, or data on a load on a driving wheel). The control circuit 682 adjusts the electric energy supplied from the battery 681 in accordance with the control signal of the processing unit 684 to control the output of the driving device 683. In the case where the AC motor is mounted, although not illustrated, an inverter which converts direct current into alternate current is also incorporated.

The battery 681 can be charged by external electric power supply using a plug-in technique. For example, the battery 681 is charged through a power plug from a commercial power source. The battery 681 can be charged by converting external power into DC constant voltage having a predetermined voltage level through a converter such as an AC-DC converter. When the power storage device of one embodiment of the present invention is provided as the battery 681, capacity of the battery 681 can be increased and improved convenience can be realized. When the battery 681 itself can be made compact and lightweight with improved characteristics of the battery 681, the vehicle can be made lightweight, leading to an increase in fuel efficiency.

Note that it is needless to say that one embodiment of the present invention is not limited to the electronic appliances described above as long as the power storage device of one embodiment of the present invention is included.

This embodiment can be implemented in combination with any of the other embodiments as appropriate.

EXAMPLE 1

The present invention is described specifically below with Example. Note that the present invention is not limited to Example below.

(Evaluation of Inorganic Compound Film by XRD)

A structure of niobium oxide was evaluated by X-ray Diffraction (XRD). Here, graphite was not used. Niobium which is a gel was formed by a sol-gel method, put into a crucible, and baked at 600° C. for 3 hours to form niobium oxide, and the niobium oxide was measured. The measurement results obtained by XRD are shown in FIG. 11.

Figure 11:
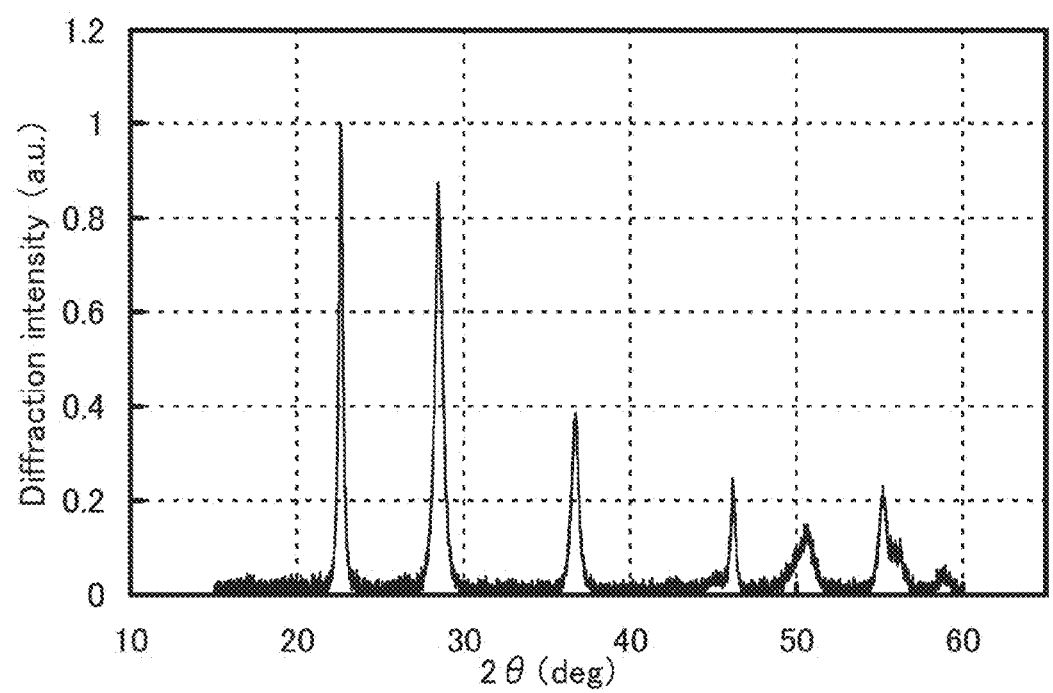
FIG. 11 shows an X-ray diffraction spectrum.

In FIG. 11, the horizontal axis represents an X-ray diffraction angle and the vertical axis represents an X-ray diffraction intensity. Peaks of the XRD spectrum represent intensity of an X-ray reflected from a crystal lattice surface. The larger the intensity of a peak of the spectrum is and the narrower the half bandwidth is, the higher the crystallinity is. Note that the crystal lattice surface and the X-ray diffraction angle correspond to each other, and a location where the peak of the XRD spectrum appears (a diffraction angle of 2θ) varies depending on a crystal structure and the crystal lattice surface.

The measurement results in FIG. 11 show that the inorganic compound film formed by the sol-gel method is $Nb_2O_5$ having a hexagonal crystal structure with a space group of P63 /mmc.

Note that the sample of niobium oxide for this measurement by XRD was baked at 600° C., and even a sample baked at 500° C. had a similar crystal structure. On the other hand, a sample baked at low temperatures ranging from 200° C. to 300° C. becomes amorphous fine particles.

(Formation of Particulate Graphite Having Inorganic Compound Film)

Next, a negative electrode active material having a niobium oxide film as an inorganic film was formed. As the negative electrode active material, graphite produced by JFE Chemical Corporation was used. First, as described in Embodiment 2, $Nb(OEt)_5$ and ethyl acetoacetate serving as a stabilizing agent to which toluene was added were stirred, so that a $Nb(OEt)_5$ toluene solution was formed. The compounding ratio of this solution was as follows: the $Nb(OEt)_5$ was $3.14 \times 10^{-4}$ mol; the ethyl acetoacetate, $6.28 \times 10^{-4}$ mol; and the toluene, 2 ml. Next, the $Nb(OEt)_5$ toluene solution to which particulate graphite that is the negative electrode active material was added was stirred in a dry room. Then, the solution was held at 50° C. in a humid environment for 3 hours so that the $Nb(OEt)_5$ in the $Nb(OEt)_5$ toluene solution to which the graphite was added was hydrolyzed and condensed. In other words, the $Nb(OEt)_5$ in the solution was made to react with water in the air so that a hydrolysis reaction gradually occurs, and the $Nb(OEt)_5$ was condensed by a dehydration reaction which sequentially occurred. In such a manner, niobium which is a gel was attached on the surface of the particulate graphite. Then, baking was performed at 500° C. in the air for 3 hours, so that the particulate graphite having an inorganic compound film containing niobium oxide as a component on part of its surface was formed.

(Observation of Inorganic Compound Film with Electron Microscope)

Figure 12A:
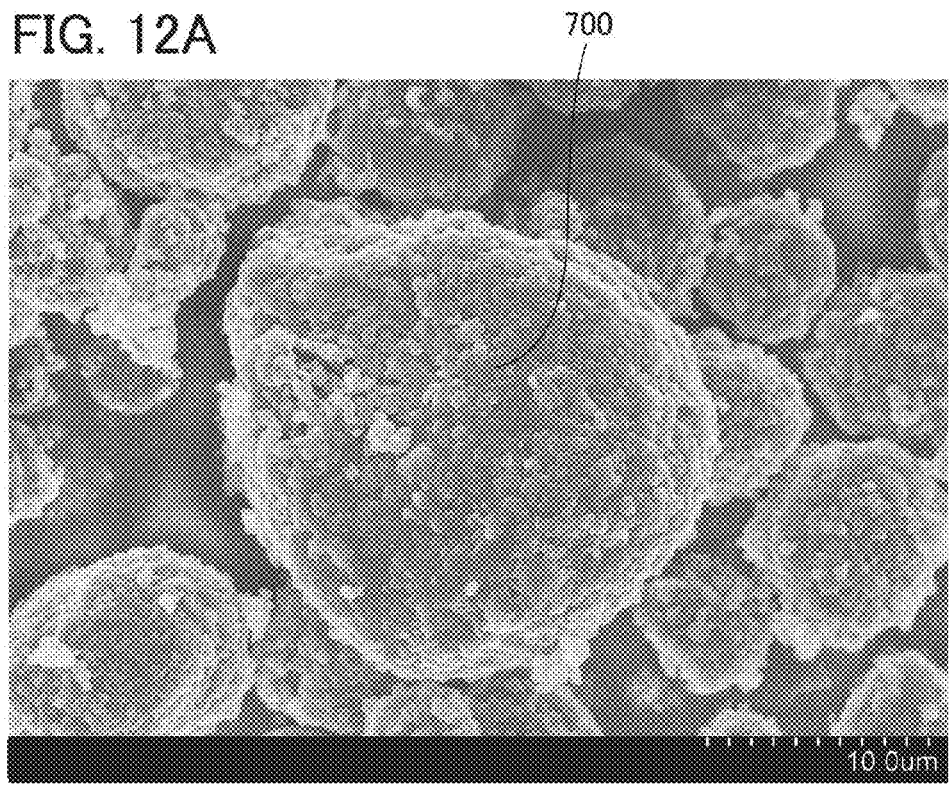
FIGS. 12A and 12B are SEM images.
Figure 12B:
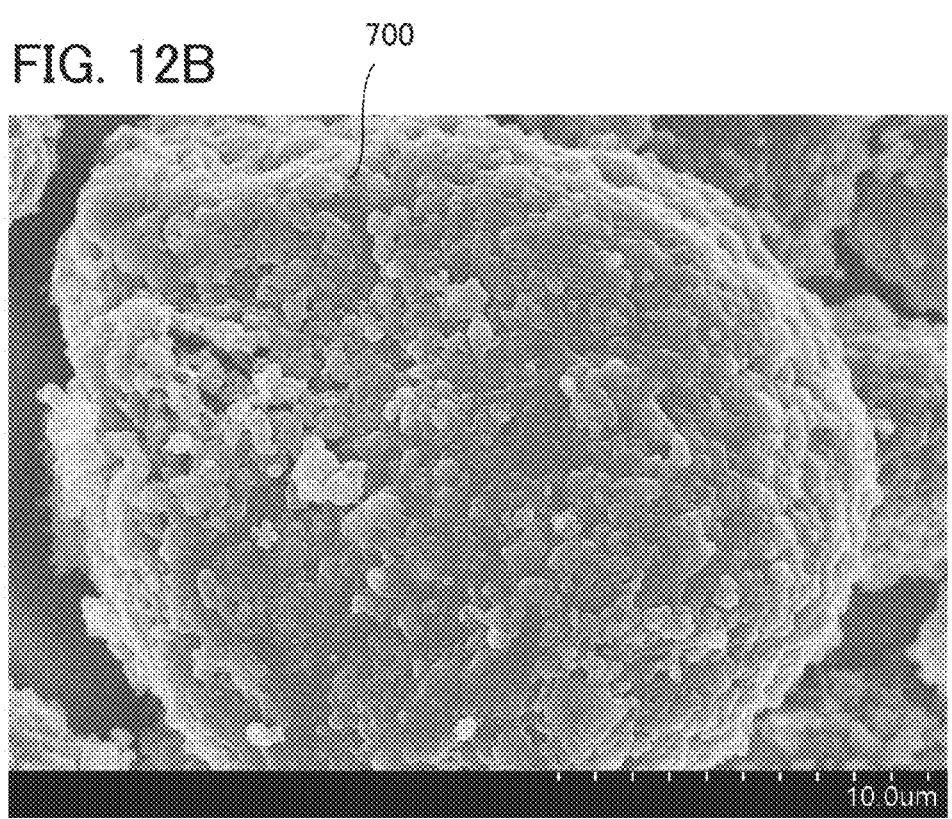

FIGS. 12A, 12B, 13A, and 13B are images of the particulate graphite observed with a scanning electron microscope (SEM). FIGS. 12A and 12B are the SEM images of particulate graphite 700 which is not provided with a niobium oxide film. FIG. 12A is the SEM image at 3000-fold magnification, and FIG. 12B is the SEM image at 5000-fold magnification of part of the SEM image in FIG. 12A. The particulate graphite 700 with a diameter of approximately 20 μm and a rough surface is observed, and small particles aggregated on the surface of the particulate graphite 700 are observed.

Figure 13A:
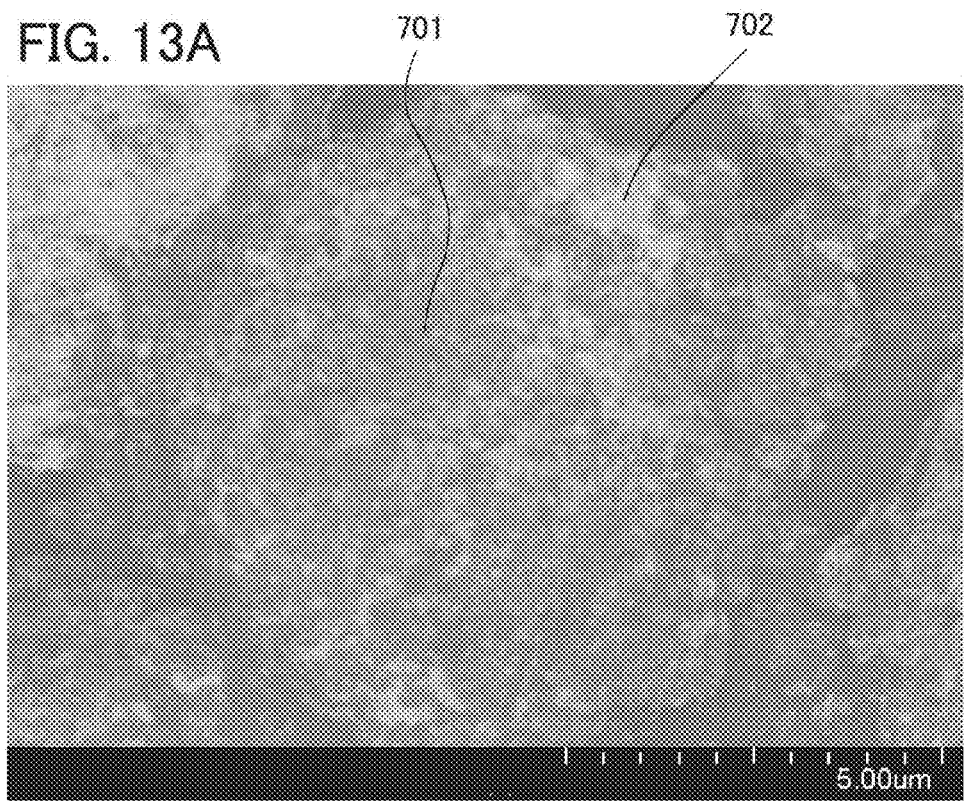
FIGS. 13A and 13B are SEM images.
Figure 13B:
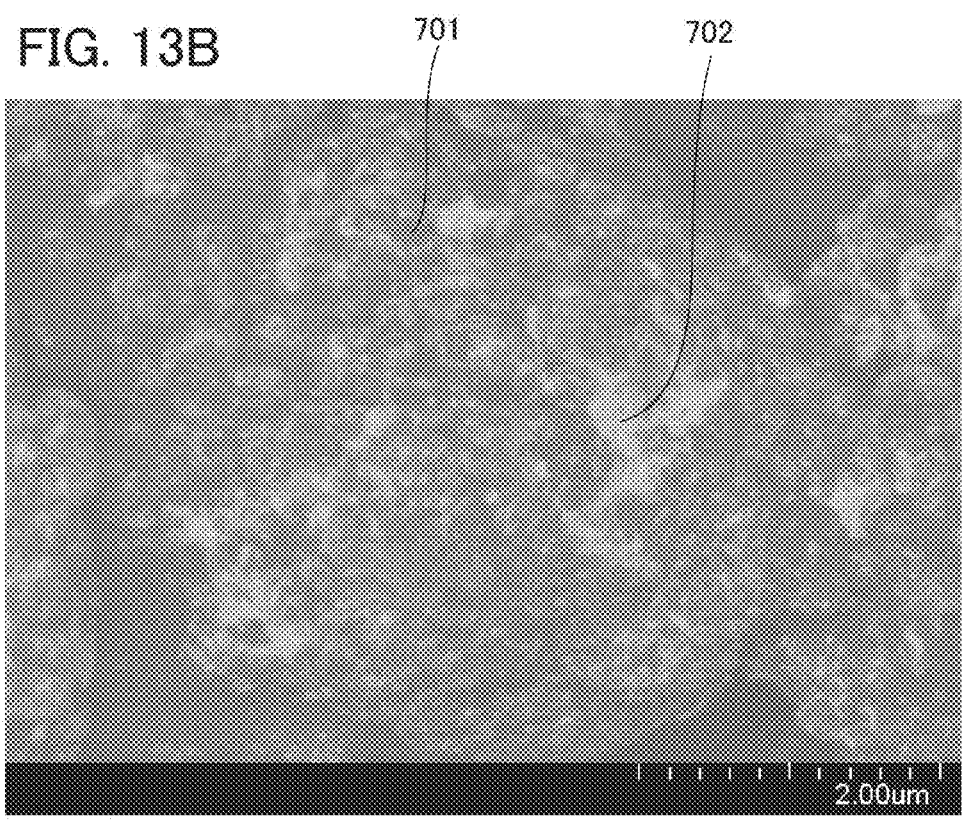

FIGS. 13A and 13B are the SEM images of the particulate graphite shown in FIGS. 12A and 12B part of a surface of which is provided with a niobium oxide film by the sol-gel method. Regions in a dark gray color in the SEM images of FIGS. 13A and 13B represent particulate graphite 701. On the other hand, white spot regions on a surface of the particulate graphite 701 are portions where niobium oxide films 702 are formed. As described above, from difference in contrast, regions where the niobium oxide films are formed and regions where the niobium films are not formed can be observed in the SEM images. It is observed that the niobium oxide films do not completely cover the surface of the particulate graphite 701, but the surface is partly covered.

Figure 14:
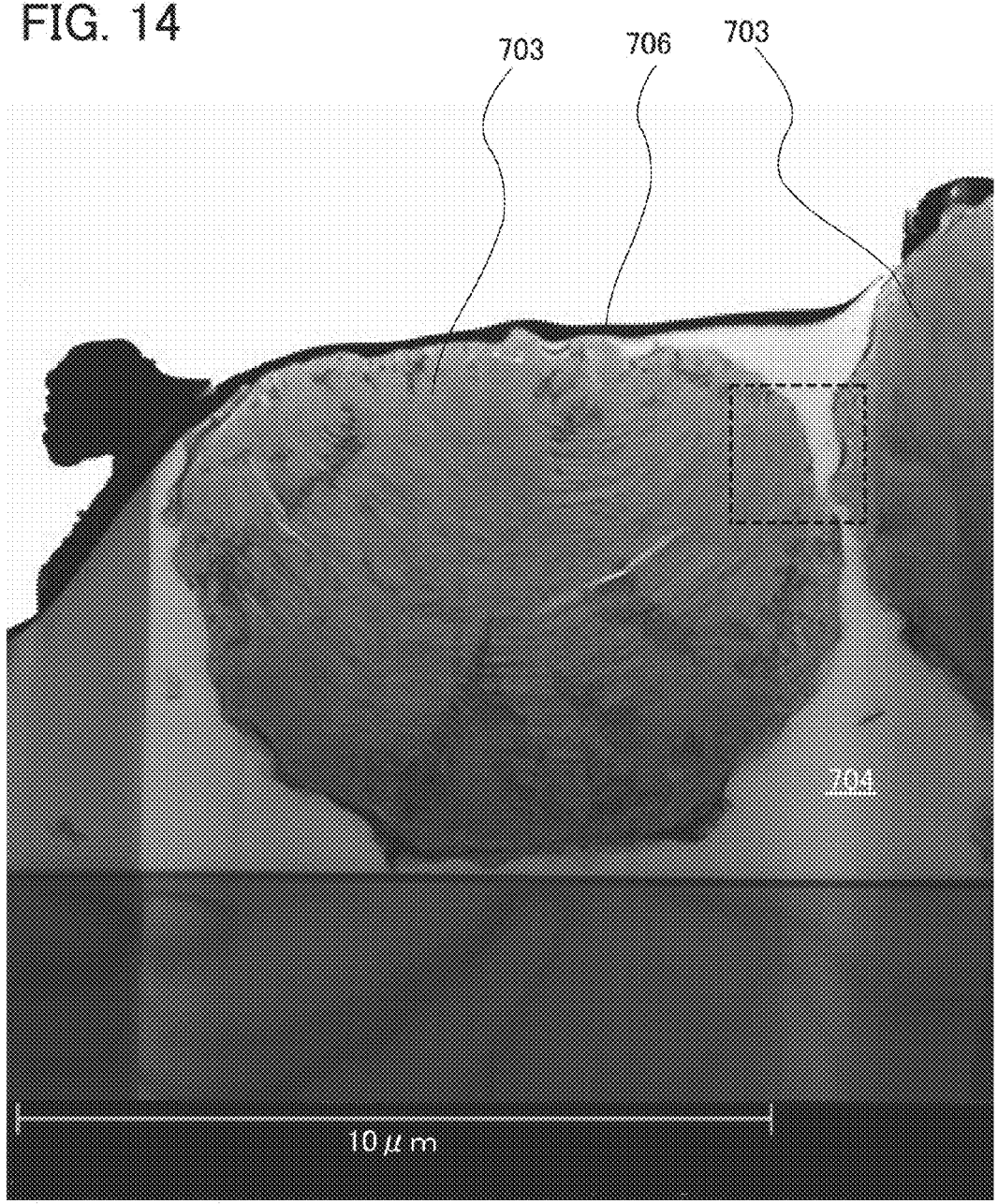
FIG. 14 is a TEM image.
Figure 15A:
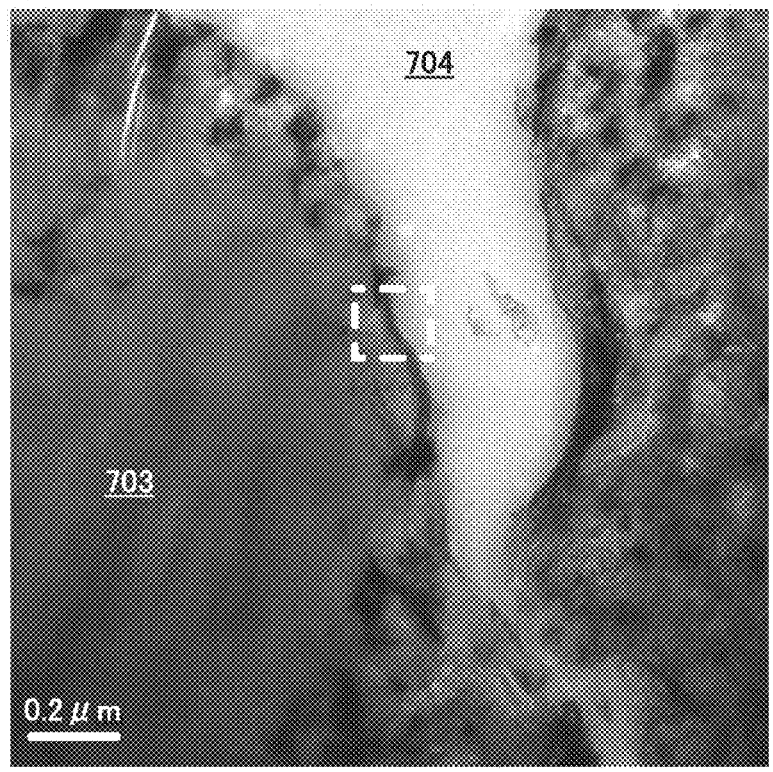
FIGS. 15A and 15B are TEM images.
Figure 15B:
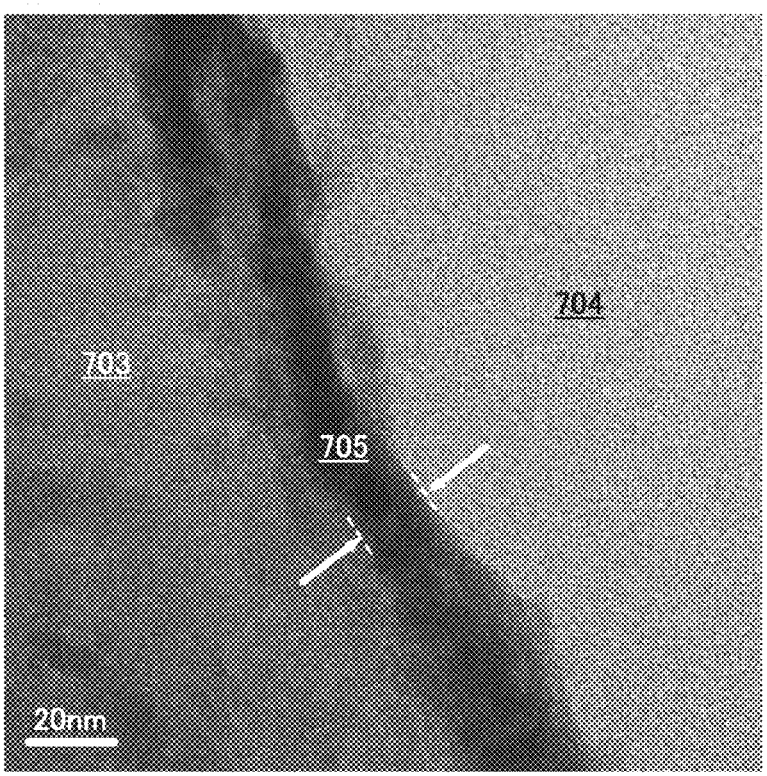

Next, a cross section of particulate graphite having a niobium oxide film on part of its surface by the sol-gel method in such a manner was observed with a transmission electron microscope (TEM). FIGS. 14, 15A, and 15B show TEM images.

FIG. 14 is the TEM image of cross sections of particles of particulate graphite 703. The particulate graphite 703 having a niobium oxide film on part of its surface was provided over a silicon wafer, and was covered with a carbon film 704 and a tungsten film 706 for processing and observation of the sample.

A layered structure inside the particulate graphite 703 can be observed. The niobium oxide film can be observed in a black color in places on the surface of the particulate graphite 703, that is, an edge portion in the cross section of the particulate graphite 703.

FIG. 15A is the enlarged TEM image of the dashed frame in FIG. 14. In the TEM image, the niobium oxide film is observed in a black color on the surface of the particulate graphite 703. In addition, FIG. 15B is the enlarged TEM image of the dashed frame in FIG. 15A. A niobium oxide film 705 formed on the surface of the particulate graphite 703 is formed along the surface of the particulate graphite 703. Since the sample sliced for the observation with TEM is thick in the depth direction in FIG. 15B and the graphite that is the observation object is particles, the thickness of the niobium oxide film 705 is difficult to measure. However, the observation result shows that the niobium oxide film 705 has a thickness of around 10 nm to 20 nm.

From the observation results obtained with the electron microscopes such as SEM and TEM, the niobium oxide film can be formed on the surface of the particulate graphite by the sol-gel method. It is found that the niobium oxide film formed by the sol-gel method is an extremely thin inorganic compound film with a thickness around 10 nm to 20 nm. Further, it is found that the niobium oxide film does not entirely cover the surface of the particulate graphite, but partly covers the surface.

(CV Measurement 1)

Next, whether or not the inorganic compound film of one embodiment of the present invention inserts and extracts lithium ions was verified by cyclic voltammetry (CV).

A three-electrode cell was used in the CV measurement. An active material layer including particulate graphite having a niobium oxide film on part of its surface was used as a working electrode; metallic lithium, a reference electrode and a counter electrode; and an electrolyte solution, 1 M lithium hexafluorophosphate ($LiPF_6$) dissolved in a mixed solution of an ethylene carbonate (EC) solution (1 mol/L) and diethyl carbonate (DEC) (volume ratio of 1:1). The measurement was performed at a scanning speed of 0.2 mV/sec in a scan range from 0 V to 2.5 V (vs. $Li/Li^+$) for 3 cycles.

Figure 16A:
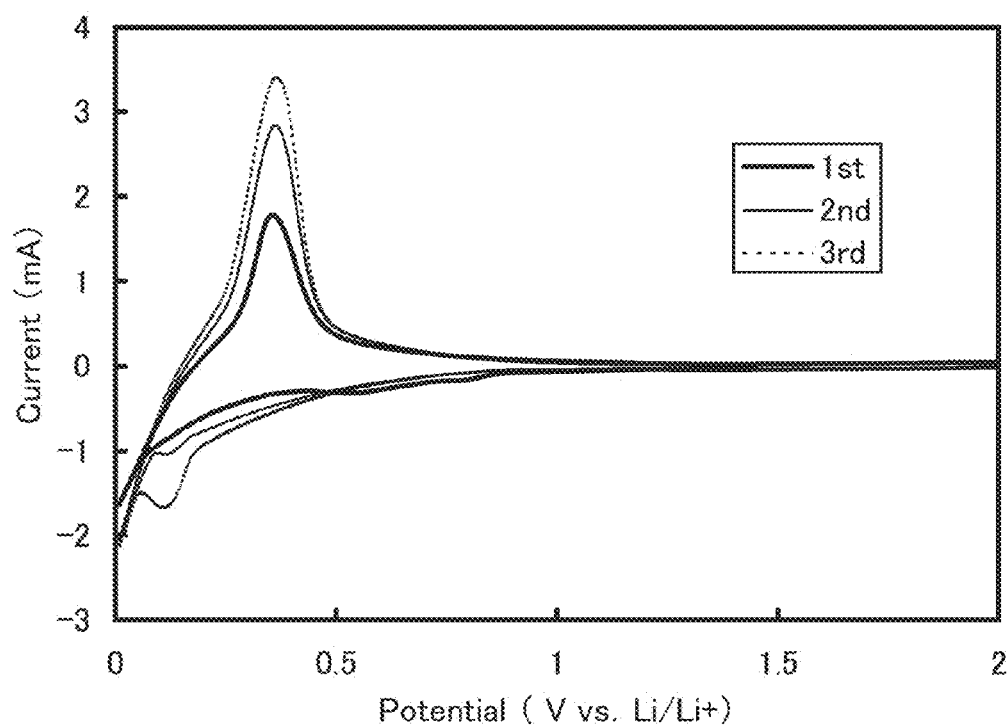
FIGS. 16A and 16B show results of CV measurement.
Figure 16B:
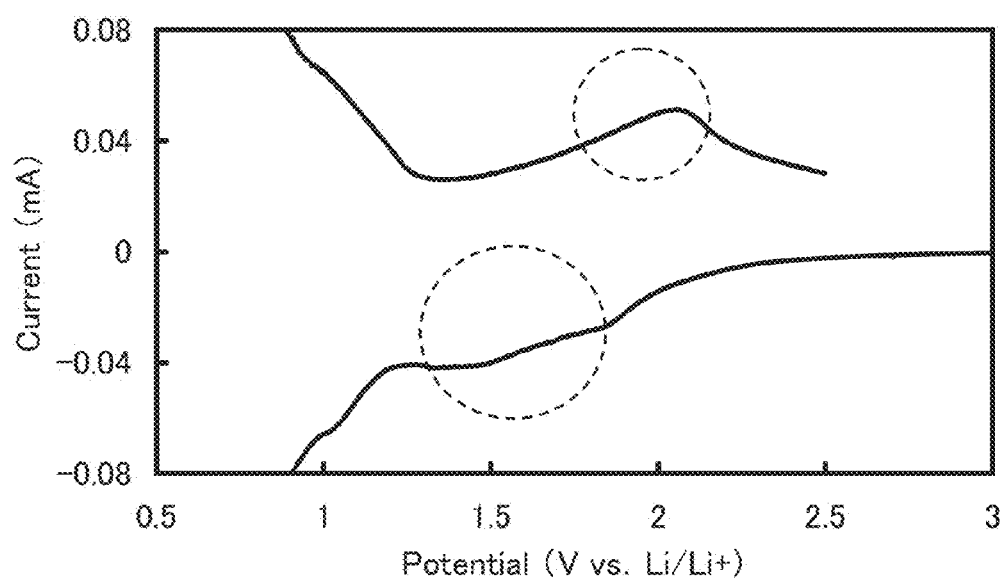

The cyclic voltammograms of the CV measurement results are shown in FIGS. 16A and 16B. FIG. 16A shows the measurement results of the 3 cycles in a scan range from 0 V to 2 V. FIG. 16B focuses on a potential around 1.5 V to 2 V in the first cycle. At the time of the insertion of lithium ions, a change in a current value can be seen inside a portion surrounded by the dashed line on the bottom of the graph. This shows that the niobium oxide film provided on part of the surfaces of the graphite particles reacted with lithium in the first insertion of lithium ions.

Figure 17A:
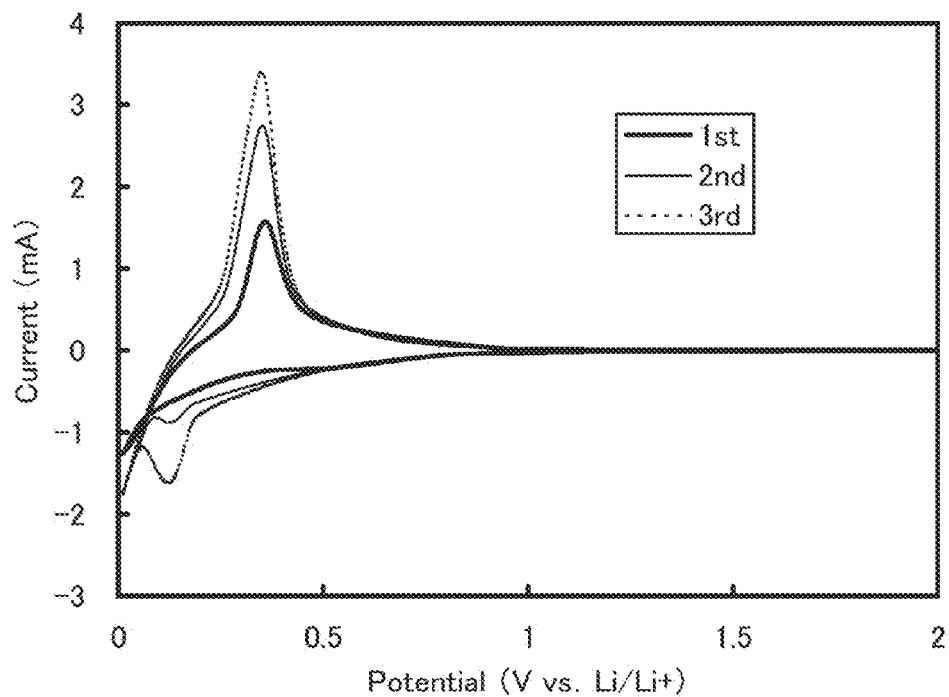
FIGS. 17A and 17B show results of CV measurement.
Figure 17B:
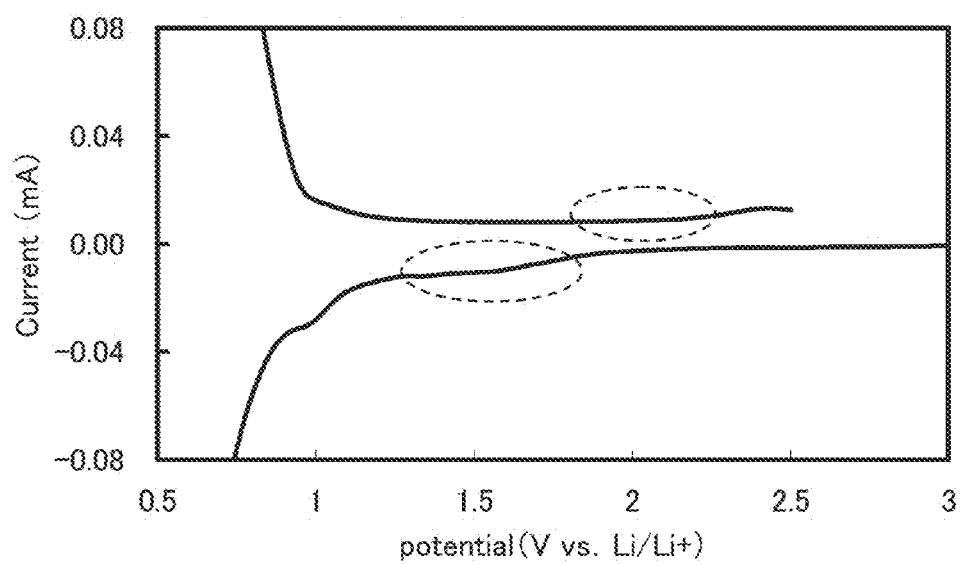

For comparison, graphite similar to the above was not provided with a niobium oxide film on its surface, and measured by CV under the same conditions. The measurement results are shown in FIGS. 17A and 17B. As shown in FIG. 17B, a big change is not seen in a current value around 1.5 V to 2 V. Therefore, FIG. 17B indicates that the change in the current value in FIG. 16B shows a reaction between lithium and the niobium oxide film.

(TEM Observation)

Figure 18:
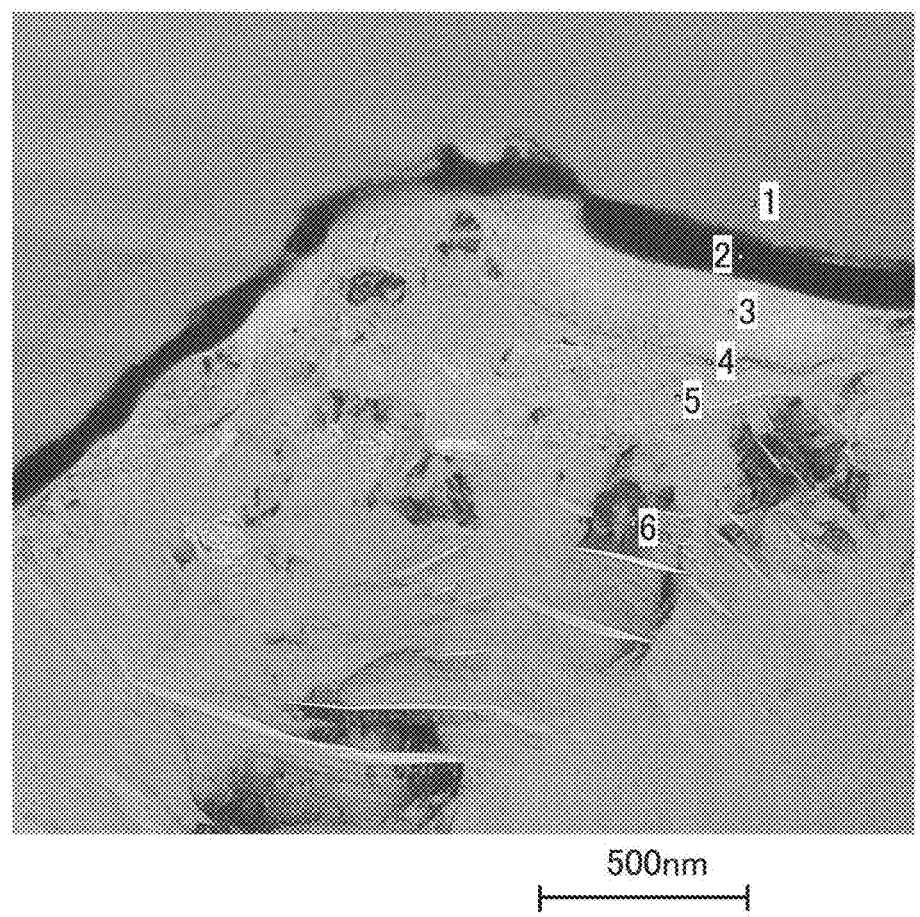
FIG. 18 is a TEM image.

Next, a negative electrode in which particulate graphite having a niobium oxide film formed by the sol-gel method as described above as an inorganic compound film was used as a negative electrode active material was formed. A half cell including part of the negative electrode, an electrolyte solution, and a reference electrode was fabricated and then, the negative electrode was observed with TEM. FIG. 18 shows a TEM image.

First, a method for forming the negative electrode is described.

Slurry was formed in which the particulate graphite having the niobium oxide formed by the sol-gel method in the above-described manner as an inorganic compound film and PVdF that is a binder were mixed in a ratio of 9:1. At this time, the proportion of the niobium oxide in the graphite was 0.5 wt %, and NMP was used as a solvent of the slurry.

Next, copper foil was used as a negative electrode current collector. The slurry including the graphite was applied onto the negative electrode current collector and dried at 70° C., and then drying treatment was performed at 170° C. in a vacuum atmosphere for 10 hours.

A lithium electrode was used as a counter electrode. A 1 M lithium hexafluorophosphate ($LiPF_6$) solution (in which a mixed solution of ethylene carbonate (EC) and diethyl carbonate (DEC) (volume ratio of 1:1) was used as a solvent) was used as the electrolyte solution.

Next, charge and discharge were performed at a rate of 0.2 C (it takes 5 hours for charge), constant current, and voltages ranging from 2 V to 4 V. Charge and discharge were performed once in one cycle. Through the above steps, a film was formed on the negative electrode active material and the inorganic compound film, whereby the negative electrode active material layer was formed. In addition, the negative electrode including the negative electrode current collector and the negative electrode active material layer was formed. FIG. 18 shows the TEM image of the negative electrode obtained by disassembling the battery charged and discharged as described above. Note that Region 1 and Region 2 are protective films for the TEM observation, and are a carbon film and a Pt film, respectively.

Figure 19A:
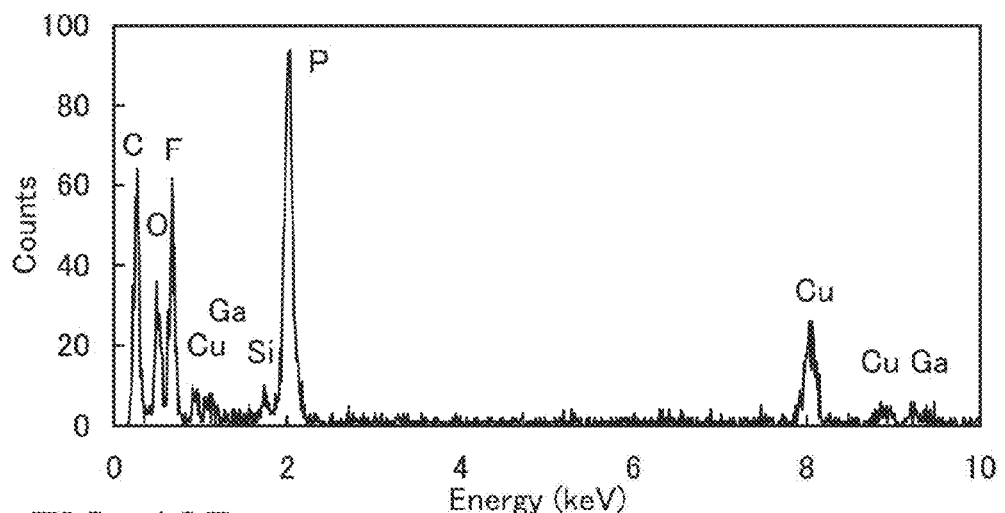
FIGS. 19A to 19C show results of EDX analysis.
Figure 19B:
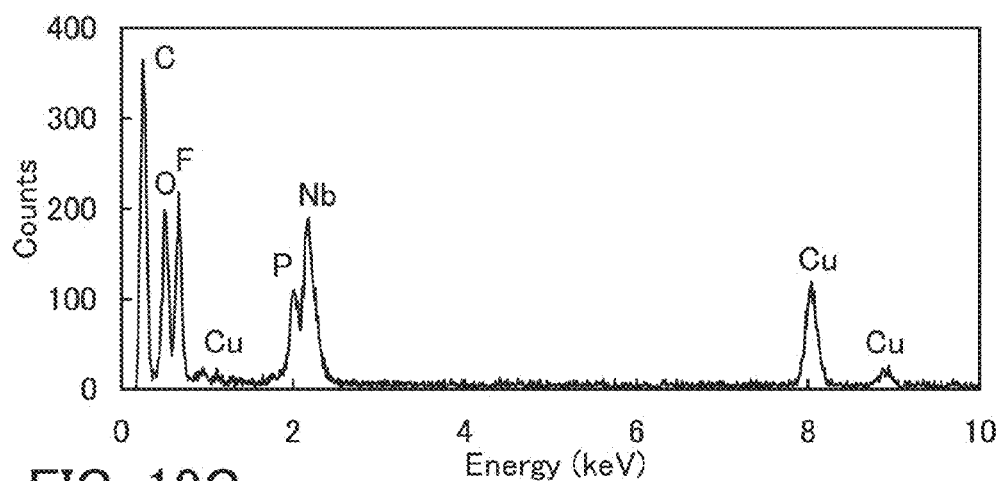
Figure 19C:
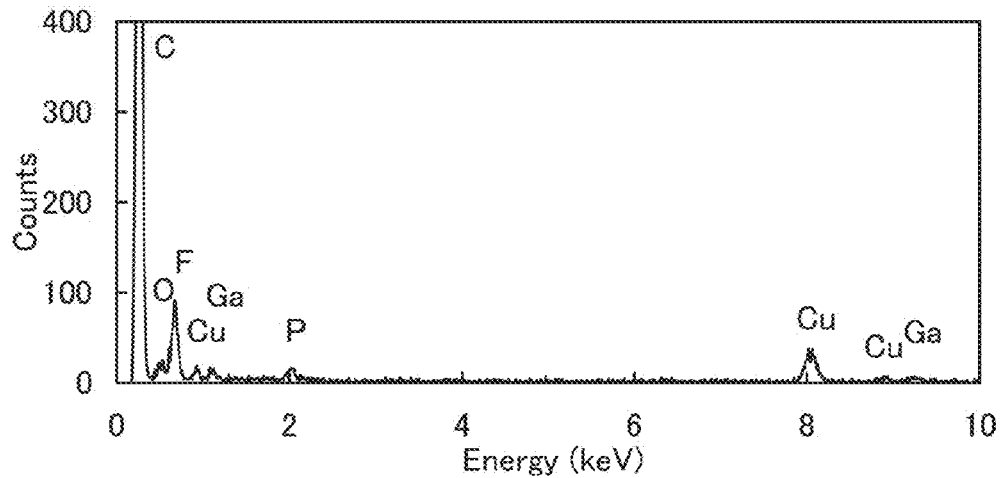

Next, energy dispersive X-ray spectrometry (EDX) analysis was performed on Regions 3 to 6 shown in FIG. 18. Results of EDX analysis of Regions 3, 4, and 5 are shown in FIGS. 19A, 19B, and 19C, respectively. In the EDX analysis, the sample was thinned by an FIB method (μ-sampling method) using Ga ions. In addition, the sample was fixed to copper mesh. For these reasons, copper or gallium is measured in FIGS. 19A to 19C. Further, trace amounts of silicon is also detected as an impurity due to the irradiation with an electron beam at the time of the EDX analysis.

As shown in FIGS. 19A to 19C, Region 3 contains carbon, oxygen, and fluorine; Region 4 contains niobium, carbon, oxygen, phosphorus, and fluorine; and Region 5 contains carbon as a main component. Note that although not shown in FIGS. 19A to 19C, Region 6 contains carbon as a main component.

FIG. 18 and FIGS. 19A to 19C show that Region 5 is a graphite particle, and Region 4 formed on a surface of the graphite particle is a 10-nm-thick inorganic compound film formed of niobium oxide. In addition, Region 3 formed on a surface of the inorganic compound film is a film which corresponds to a reductive decomposition product of a reductive decomposition reaction of the electrolyte solution or a product of a reaction between the reductive decomposition product and the electrolyte solution. Note that the carbon and the fluorine are detected in Region 4 because of the influence of Region 3 in the EDX analysis.

Through the above steps, the negative electrode active material layer which includes the negative electrode active material having the inorganic compound film on part of its surface and the film in contact with an exposed portion of the negative electrode active material and the inorganic compound film can be formed.

(Evaluation of Cycle Performance)

Next, a negative electrode in which particulate graphite having a niobium oxide film formed by the sol-gel method in the above-described manner as an inorganic compound film was used as a negative electrode active material was formed. The negative electrode, an electrolyte solution, and a positive electrode were assembled as a full cell. Then, the full cell was charged and discharged once to manufacture a secondary battery. Then, the cycle performance of the secondary battery was measured.

The performance was measured using coin cells. As the electrolyte solution, a 1 M lithium hexafluorophosphate ($LiPF_6$) solution was used. Note that as a solvent of the electrolyte solution, a mixed solvent in which ethylene carbonate (EC) and diethyl carbonate (DEC) were mixed at a volume ratio of 1:1 was used. As a separator, polypropylene (PP) was used. First charge and discharge were performed at a rate of 0.2 C (it takes 5 hours for charge), and second charge and discharge were performed at a rate of 1 C (it takes 1 hour for charge). In the 200th cycle, charge and discharge were performed at a rate of 0.2 C (it takes 5 hours for charge) to measure discharge capacity. Further, all charges and discharges were performed at constant current, voltages ranging from 2 V to 4 V, and an environment temperature of 60° C. Under such conditions, the measurement was performed.

The cycle performance of each of a negative electrode including particulate graphite, which has a niobium film as an inorganic compound film of part of its surface, as a negative electrode active material and a negative electrode including particulate graphite, which does not have an inorganic compound film, as a negative electrode active material was evaluated. Moreover, as the graphite having the niobium oxide film, the one in which the weight ratio of niobium oxide was 0.5 wt % to the graphite was formed.

The measurement results of the cycle performance are shown in FIG. 20. The horizontal axis represents the number of cycles (times) and the vertical axis represents discharge capacity (mAh/g) of the secondary batteries. The number of measured samples (n) of the electrode which has 0.5 wt % of niobium oxide and the electrode which does not have a niobium oxide film were two (n=2) and one (n=1), respectively. In FIG. 20, curves 810*a* and 810*b* show the cycle performance of the electrode which has 0.5 wt % of niobium oxide and a curve 820 shows the cycle performance of the electrode which does not have the niobium oxide film.

As a result of the measurement, as shown by the curve 820, in the case of the secondary battery including the particulate graphite, which does not have the inorganic film containing a niobium oxide film as a component, as the negative electrode active material, the discharge capacity decreases as the number of cycles increases. That is, deterioration is significant.

In contrast, as shown by the curves 810*a* and 810*b*, in the secondary battery including the particulate graphite, which has the niobium oxide film as the inorganic compound film, as a negative electrode active material, although the discharge capacity tends to decrease, the capacity is not greatly reduced, which is unlike in the secondary battery including the particulate graphite, which does not have the inorganic compound film. Thus, it is found that deterioration is sufficiently suppressed. The deterioration is particularly suppressed at an environment temperature of 60° C. Consequently, it is possible to increase the cycle performance.

(Evaluation)

As described above, the decomposition reaction of the electrolyte solution and the like caused as a side reaction of charge and discharge is minimized in repeated charge and discharge of a lithium ion battery, resulting in an improvement in the cycle performance of the lithium ion battery.

This application is based on Japanese Patent Application serial No. 2012-126355 filed with Japan Patent Office on Jun. 1, 2012 and Japanese Patent Application serial No. 2013-047833 filed with Japan Patent Office on Mar. 11, 2013, the entire contents of which are hereby incorporated by reference.

What is claimed is:

1. A power storage device comprising:
   a positive electrode;
   a negative electrode; and
   an electrolyte,
   wherein the negative electrode comprises:
      a current collector;
      an active material layer over the current collector, the active material layer comprising a first particle of an active material, and a first film comprising an inner surface on a first region of the first particle; and
      a second film covering the first particle and the first film,
   wherein the first particle comprises silicon,
   wherein the first film comprises an oxide of any one of aluminum, titanium, niobium, vanadium, tantalum, tungsten, zirconium, molybdenum, hafnium, chromium, and silicon,
   wherein the second film comprises an organic material and an inorganic material,
   wherein the second film is in contact with a second region of the first particle, and
   wherein the second film is in contact with an outer surface of the first film.

2. The power storage device according to claim 1, wherein the first particle has an average diameter of more than or equal to 6 μm and less than or equal to 30 μm.

3. The power storage device according to claim 1, wherein the first film has a thickness of more than or equal to 5 nm and less than or equal to 50 nm.

4. The power storage device according to claim 1, wherein the inorganic material is one of a fluoride, a carbonate, an oxide, and a hydroxide of a material selected from lithium, sodium, potassium, calcium, strontium, barium, beryllium, and magnesium.

5. The power storage device according to claim 1, wherein the inorganic material is one of lithium fluoride, lithium carbonate, lithium oxide, and lithium hydroxide.

6. The power storage device according to claim 1,
   wherein the active material layer further comprises a second particle of the active material, and a third film comprising an inner surface on a first region of the second particle,
   wherein the second particle comprises silicon,
   wherein the third film comprises an oxide of the one of aluminum, titanium, niobium, vanadium, tantalum, tungsten, zirconium, molybdenum, hafnium, chromium, and silicon,
   wherein the third film is in contact with a second region of the second particle,
   wherein the second film is further in contact with an outer surface of the third film, and
   wherein the first particle is in contact with the third film and the second particle.

7. The power storage device according to claim 1, wherein the first film is formed from the oxide.

8. A power storage device comprising:
   a positive electrode;
   a negative electrode; and
   an electrolyte,
   wherein the negative electrode comprises:
      a current collector;
      an active material layer over the current collector, the active material layer comprising a first particle of an active material, and a first film comprising an inner surface on a first region of the first particle; and
      a second film covering the first particle and the first film,
   wherein the first particle comprises silicon,
   wherein the first film comprises aluminum and oxygen,
   wherein the second film comprises an organic material and an inorganic material,
   wherein the second film is in contact with a second region of the first particle, and
   wherein the second film is in contact with an outer surface of the first film.

9. The power storage device according to claim 8, wherein the first particle has an average diameter of more than or equal to 6 μm and less than or equal to 30 μm.

10. The power storage device according to claim 8, wherein the first film has a thickness of more than or equal to 5 nm and less than or equal to 50 nm.

11. The power storage device according to claim 8, wherein the inorganic material is one of a fluoride, a carbonate, an oxide, and a hydroxide of a material selected from lithium, sodium, potassium, calcium, strontium, barium, beryllium, and magnesium.

12. The power storage device according to claim 8, wherein the inorganic material is one of lithium fluoride, lithium carbonate, lithium oxide, and lithium hydroxide.

13. The power storage device according to claim 8,
wherein the active material layer further comprises a second particle of the active material, and a third film comprising an inner surface on a first region of the second particle,
wherein the second particle comprises silicon,
wherein the third film comprises aluminum and oxygen,
wherein the third film is in contact with a second region of the second particle,
wherein the second film is further in contact with an outer surface of the third film, and
wherein the first particle is in contact with the third film and the second particle.

14. The power storage device according to claim 8,
wherein the first particle is formed from silicon, and
wherein the first film is formed from aluminum and oxygen.

15. A power storage device comprising:
a positive electrode;
a negative electrode; and
an electrolyte,
wherein the negative electrode comprises:
  a current collector;
  an active material layer over the current collector, the active material layer comprising a first particle of an active material, and a first film comprising an inner surface on a first region of the first particle; and
  a second film covering the first particle and the first film,
  wherein the first particle comprises silicon and oxygen,
  wherein the first film comprises aluminum and oxygen,
  wherein the second film comprises an organic material and an inorganic material,
  wherein the second film is in contact with a second region of the first particle, and
  wherein the second film is in contact with an outer surface of the first film.

16. The power storage device according to claim 15, wherein the first particle has an average diameter of more than or equal to 6 μm and less than or equal to 30 μm.

17. The power storage device according to claim 15, wherein the first film has a thickness of more than or equal to 5 nm and less than or equal to 50 nm.

18. The power storage device according to claim 15, wherein the inorganic material is one of a fluoride, a carbonate, an oxide, and a hydroxide of a material selected from lithium, sodium, potassium, calcium, strontium, barium, beryllium, and magnesium.

19. The power storage device according to claim 15, wherein the inorganic material is one of lithium fluoride, lithium carbonate, lithium oxide, and lithium hydroxide.

20. The power storage device according to claim 15,
wherein the active material layer further comprises a second particle of the active material, and a third film comprising an inner surface on a first region of the second particle,
wherein the second particle comprises silicon and oxygen,
wherein the third film comprises aluminum and oxygen,
wherein the third film is in contact with a second region of the second particle,
wherein the second film is further in contact with an outer surface of the third film, and
wherein the first particle is in contact with the third film and the second particle.

21. The power storage device according to claim 15,
wherein the first particle is formed from silicon and oxygen, and
wherein the first film is formed from aluminum and oxygen.

22. A power storage device comprising:
a positive electrode;
a negative electrode; and
an electrolyte,
wherein the negative electrode comprises:
  a current collector;
  an active material layer over the current collector, the active material layer comprising a first particle of an active material, and a first film comprising an inner surface on a first region of the first particle; and
  a second film covering the first particle and the first film,
  wherein the first particle comprises silicon and oxygen,
  wherein the first film comprises titanium and oxygen,
  wherein the second film comprises an organic material and an inorganic material,
  wherein the second film is in contact with a second region of the first particle, and
  wherein the second film is in contact with an outer surface of the first film.

23. The power storage device according to claim 22, wherein the first particle has an average diameter of more than or equal to 6 μm and less than or equal to 30 μm.

24. The power storage device according to claim 22, wherein the first film has a thickness of more than or equal to 5 nm and less than or equal to 50 nm.

25. The power storage device according to claim 22, wherein the inorganic material is one of a fluoride, a carbonate, an oxide, and a hydroxide of a material selected from lithium, sodium, potassium, calcium, strontium, barium, beryllium, and magnesium.

26. The power storage device according to claim 22, wherein the inorganic material is one of lithium fluoride, lithium carbonate, lithium oxide, and lithium hydroxide.

27. The power storage device according to claim 22,
wherein the active material layer further comprises a second particle of the active material, and a third film comprising an inner surface on a first region of the second particle,
wherein the second particle comprises silicon and oxygen,
wherein the third film comprises titanium and oxygen,
wherein the third film is in contact with a second region of the second particle,
wherein the second film is further in contact with an outer surface of the third film, and
wherein the first particle is in contact with the third film and the second particle.

28. The power storage device according to claim 22,
wherein the first particle is formed from silicon and oxygen, and
wherein the first film is formed from titanium and oxygen.

* * * * *